United States Patent
Takamura et al.

(10) Patent No.: US 8,180,952 B2
(45) Date of Patent: May 15, 2012

(54) STORAGE SYSTEM AND DATA GUARANTEE METHOD

(75) Inventors: Yukiyoshi Takamura, Kamakura (JP); Naoto Shiino, Ooi (JP)

(73) Assignee: Hitachi, Ltd., Tokyo (JP)

(*) Notice: Subject to any disclaimer, the term of this patent is extended or adjusted under 35 U.S.C. 154(b) by 799 days.

(21) Appl. No.: 12/289,059

(22) Filed: Oct. 20, 2008

(65) Prior Publication Data
US 2010/0057978 A1 Mar. 4, 2010

(30) Foreign Application Priority Data
Aug. 26, 2008 (JP) ................................. 2008-217217

(51) Int. Cl.
*G06F 12/02* (2006.01)
(52) U.S. Cl. ................................. 711/103; 711/E12.002
(58) Field of Classification Search ........................ None
See application file for complete search history.

(56) References Cited

U.S. PATENT DOCUMENTS

| | | | |
|---|---|---|---|
| 6,931,509 B2* | 8/2005 | Lloyd-Jones | 711/206 |
| 6,981,171 B2* | 12/2005 | Hashemi | 714/5.11 |
| 7,415,633 B2* | 8/2008 | Jamil et al. | 714/17 |
| 7,607,048 B2* | 10/2009 | Echeruo et al. | 714/42 |
| 2002/0184556 A1* | 12/2002 | Hashemi | 714/6 |
| 2004/0064655 A1* | 4/2004 | Paulraj | 711/154 |
| 2004/0187117 A1* | 9/2004 | Orion et al. | 718/100 |
| 2004/0199743 A1* | 10/2004 | Loaiza et al. | 711/202 |
| 2004/0216027 A1* | 10/2004 | Ueno | 714/758 |
| 2006/0098320 A1* | 5/2006 | Koga et al. | 360/53 |
| 2006/0195768 A1* | 8/2006 | Hassner et al. | 714/781 |
| 2006/0242513 A1* | 10/2006 | Loaiza et al. | 714/727 |
| 2006/0248378 A1* | 11/2006 | Grcanac et al. | 714/6 |
| 2006/0248434 A1* | 11/2006 | Radke et al. | 714/763 |
| 2007/0028140 A1* | 2/2007 | Takeda | 714/6 |
| 2008/0022163 A1* | 1/2008 | Tanaka et al. | 714/710 |
| 2008/0294947 A1* | 11/2008 | Hoshizawa et al. | 714/701 |
| 2009/0327818 A1* | 12/2009 | Kogelnik | 714/49 |

FOREIGN PATENT DOCUMENTS
JP 2008-9635 6/2006

* cited by examiner

*Primary Examiner* — Edward Dudek, Jr.
*Assistant Examiner* — Ralph A Verderamo, III
(74) *Attorney, Agent, or Firm* — Stites & Harbison, PLLC; Juan Carlos A. Marquez, Esq

(57) ABSTRACT

A system according to the invention reads/writes data by using a memory device performing a wear leveling. A host 4 reads/writes data from/in a flash memory device 2. A first protection code BC is added to the end of a logical block for every logical block of 512 bytes. A second protection code FC is added to the head of the logical blocks. The first protection code BC and the second protection code FC are configured to include data for specifying the logical address. When data is read from the flash memory device 2, the logical address obtained from the first protection code BC is compared to the logical address obtained from the second protection code. When both logical addresses are identical, it is determined that correct data is read.

16 Claims, 20 Drawing Sheets

STORAGE SYSTEM AND DATA GUARANTEE METHOD

CROSS REFERENCES TO RELATED APPLICATIONS

This application relates to and claims priority from Japanese Patent Application No. 2008-217217, filed on Aug. 26, 2008, the entire disclosure of which is incorporated herein by reference.

BACKGROUND OF THE INVENTION

1. Field of the Invention

The present invention relates to a storage system and a data guarantee method.

2. Description of the Related Art

A storage system includes, for example, a storage device and a storage controller for controlling the storage device. As the storage device, a hard disk drive is used widely. In a company, data to be stored for a long time is increased everyday. Thus, the number of hard disk drives mounted in the storage device is also increased. The hard disk drive is large in an outer diameter size or in a weight, and also has high power consumption comparing with a memory device such as a semiconductor memory.

Recently, a flash memory device is attracting attention instead of the hard disk drive. The flash memory device has lower power consumption than the hard disk drive and the speed for reading data is also high. Further, the flash memory device can be manufactured in a reduced size because there is no mechanical moving component, so that the mechanical trouble is hard to occur.

When new data is tried to be written in the flash memory device, data having been stored in a block is erased all at once in order to store new data in the erased block. However, since a period of time required for erasing data in a block is longer than that of writing data, writing performance is decreased. In addition, there is a limitation on the number of times erasing the block. When the blocks are erased above the limitation, reliability thereof is deteriorated, so that it can be used no longer.

Here, the flash memory device manages the received data by converting a logical address thereof into a physical address in the flash memory, and writes the received data in an empty block. In this way, without erasing data in the block, the received data can be written, so that the responsiveness to writing can be increased. Further, it is possible to prevent a typical block from being intensively used (erased), to control each block in the flash memory to be uniformly used, and to lengthen the lifespan of the flash memory device by managing a correspondence between logical addresses and physical addresses.

The above-mentioned address conversion process is referred to, for example, as a wear leveling process and performed in the flash memory device. If a correspondence relationship between the logical address and the physical address is managed incorrectly, desired data cannot be read out and reliability of a storage system is reduced. For this reason, a technology in that a protection code for specifying address information of writing page is generated and is combined with target writing data so as to be written in the flash memory is disclosed (Patent Document 1). According to the prior art, it is possible to determine whether or not data read from the flash memory is correct by comparing address information which is specified from the protection code added to data read from the flash memory and a logical address of data of a read target.

[Patent Document 1] Japanese Unexamined Patent Application Publication No. 2008-9635

SUMMARY OF THE INVENTION

According to the prior art, since a protection code is set in unit of pages, the protection code can only be read in unit of pages. That is, since data cannot be read or written in unit of logical blocks, there is discomfort in use. In addition, when data having a small size is read or written, a responsiveness performance is decrease.

The present invention has been made in the above circumstance, and an object of the present invention is to provide a storage system and a data guarantee method, which can read data with high reliability and convenience by using a storage device performing a wear leveling. In addition, a further object of the present invention will be apparent from embodiments described later.

In order to solve the above-mentioned problems, according to an aspect of the invention, there is provided a storage system including: a storage device for storing received data, the storage device performing a wear leveling process for taking an average of the number of used times in unit of pages; a storage controller for controlling the storage device; an address data setting control unit which associates an address for specifying a logical address of the data to both before and after the data with respect to at least data stored over a plurality of pages in the storage device among data stored in the storage device; and a determination unit which determines whether or not the data stored over the plurality of pages is correct based on the address data associated to the both before and after the data when the data stored over the plurality of pages is read.

According to the storage system having the above-described configuration, a size of a first logical block used for managing data in the storage device may be different from a size of a second logical block used for managing data in the storage controller, and the address data setting control unit may include a first setting unit for converting the first logical block into the second logical block by setting first address data for specifying a logical address of the first logical block to one side of both before and after the first logical block with respect to the data stored in the first logical block.

According to the storage system having the above-described configuration, the pages may be set to n (n>2) times the size of the first logical block, the address data setting control unit may further include a second setting unit which sets second address data for specifying a logical address of the first logical block to the other of both before and after the first logical block with respect to the data stored in the first logical block, and the determination unit may determine that the second logical block data stored over the plurality of pages is read correctly when the first address data is identical to the second address data, and determine that the second logical block data stored over the plurality of pages is read incorrectly when the first address data and the second address data are not identical.

According to the storage system having the above-described configuration, the pages may be set to identical to the size of the first logical block, the address data setting control unit may further include a second setting unit which copies first address data included in a page preceding to a predetermined page, which does not include the first address data among the pages, to the head of the predetermined page as second address data with respect to the predetermined page, and the determination unit may determine that the second logical block data stored over the plurality of pages is read correctly when the first address data and the second address data are identical, and determine that the second logical block data stored over the plurality of pages is read incorrectly when the first address data and the second address data are not identical.

According to the storage system having the above-described configuration, the pages may be set to n (n>2) times the size of the first logical block, and the determination unit may determine whether or not the second logical block data stored over the plurality of pages is read correctly by comparing the first address data included in the second logical block data and other first address data included in the second logical block data preceding to the second logical block data when the second logical block data stored over the plurality of pages is read.

According to the storage system having the above-described configuration, the determination unit may determine that the second logical block data is read correctly when a first address data vale included in the second logical block data stored over the plurality of pages is contiguous to the other first address data value.

According to the storage system having the above-described configuration, the first setting unit may set checking data for checking the first logical block data in addition to the data to the first address data.

According to the storage system having the above-described configuration, the storage device may include a flash memory device.

According to the storage system having the above-described configuration, the address data setting control unit may be provided in the storage controller.

According to the storage system having the above-described configuration, the address data setting control unit may be dispersedly provided at both of the storage controller and the storage device.

According to the storage system having the above-described configuration, the second setting unit and the determination unit may be provided in the storage device.

According to the storage system having the above-described configuration, the determination unit may be provided in the storage device.

According to the storage system having the above-described configuration, the storage device may be provided with a controller and a memory chip controlled by the controller and the controller may manage a correspondence relationship between a logical address of data received from a host computer and a page address and pointer of the memory chip.

According to the storage system having the above-described configuration, the storage device may include a flash memory device, a size of a first logical block used for managing data in the storage device is different from a size of a second logical block used for managing data in the storage controller, the address data setting control unit may include: (1) a first setting unit which converts the first logical block into the second logical block by setting first address data for specifying a logical address of the first logical block and checking data for checking the first logical block data to one of both before and after the first logical block with respect to the data stored in the first logical block; and (2) a second setting unit which sets second address data for specifying a logical address of the first logical block to the other of both before and after the first logical block with respect to the data stored in the each first logical block, and the second setting unit may, (2A) set a logical address of the first logical block to the other side of the first logical block as the second address data, (2B) copy first address data having a page preceding to a predetermined page, which does not include the first address data among the pages, to the head of the predetermined page as second address data with respect to the predetermined page, or (2C) use address data obtained by adding a predetermined value to the first address data set in another second logical block preceding to the second logical block stored over the plurality of pages, as the second address data.

According to another aspect of the invention, there is provided a data guarantee method of guaranteeing data read from a storage device to be correct data, wherein a wear leveling is performed in the storage device in order to take an average of the number of used times in unit of pages, and a size of a first logical block used for managing data in the storage device is different from a size of a second logical block used for managing data in the storage device, the data guarantee method comprising the steps of: converting the first logical block into the second logical block with respect to each of data stored in the first logical blocks by setting the first address data for specifying a logical address of the first logical block to the rear side of the first logical block when the storage device is requested for writing therein; and determining whether or not the second logical block data stored over the plurality of pages is read correctly by comparing the first address data included in the second logical block data and another first address data included in a second logical block data preceding to the second logical block data when the second logical block data stored over the plurality of pages is read.

All or some of components of the present invention may be configured by a computer program. This computer program can be fixed in a recording medium for transferring, and can be transmitted over a communication network such as internet. Further, aspects of the present invention can be properly combined in addition to combinations explicated herein, and such combinations fall within the scope of the invention.

BRIEF DESCRIPTION OF THE DRAWINGS

The invention will be described with reference to the accompanying drawings, wherein identical numbers reference identical elements.

DESCRIPTION OF THE PREFERRED EMBODIMENTS

Figure 1:
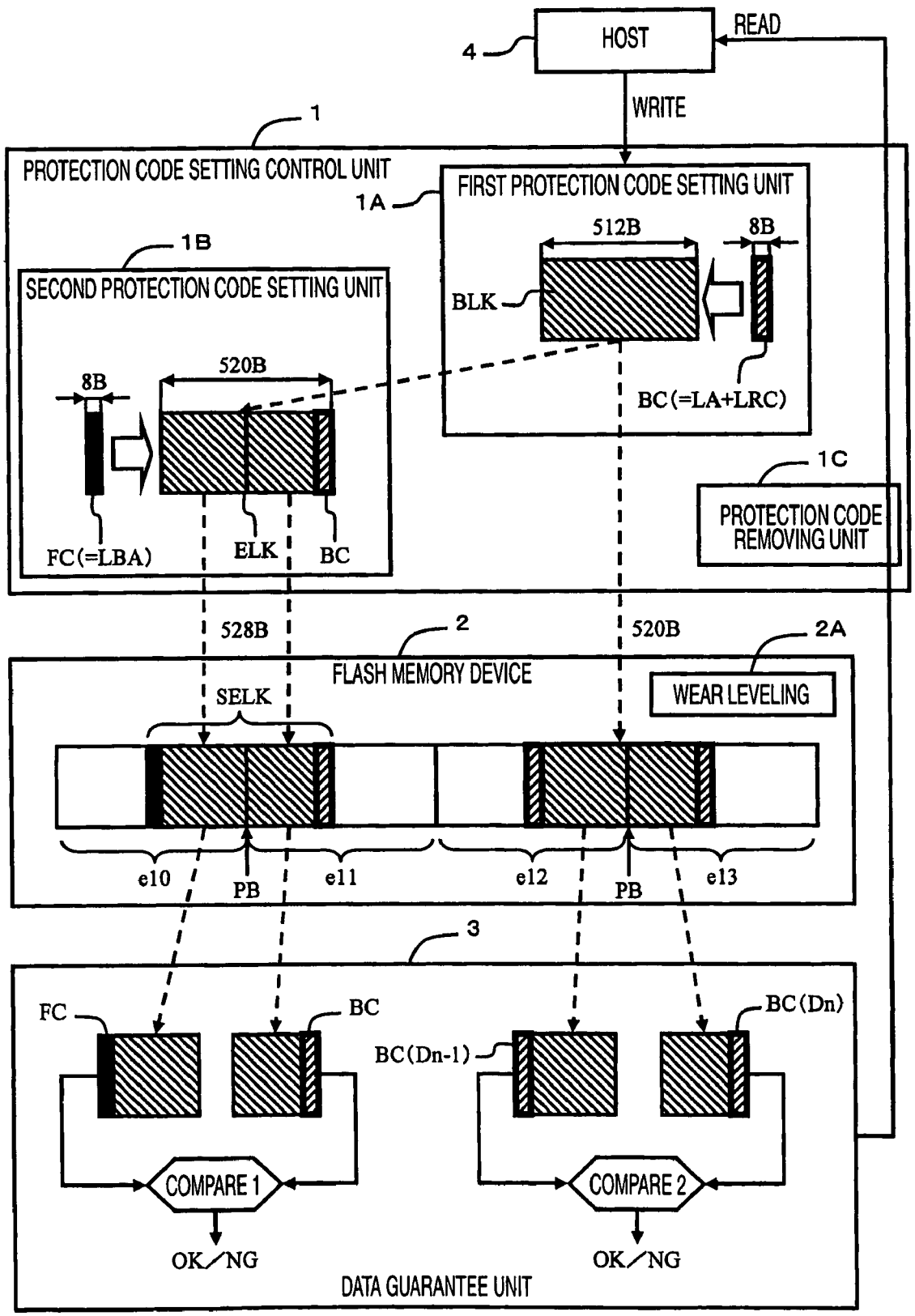
FIG. 1 is an explanatory view illustrating a concept according to an embodiment of the present invention.

Hereinafter, embodiments of the present invention will be described with reference to the accompanying drawings. FIG. 1 is an explanatory view illustrating an entire concept of the present invention. The structure of the present invention will be further detailed through the embodiments described later. A storage system according to the embodiment shown in FIG. 1 is provided with, for example, a protection code setting control unit 1 serving as "address data setting control unit," a flash memory device 2 serving as "storage device," and a data guarantee unit 3 serving as "determination unit."

In the protection code setting control unit 1, a predetermined protection code is set for every logical block with respect to data received from a host computer (hereinafter, referred to as host) 4. The protection code setting control unit 1 includes at least a first protection code setting unit 1A. In some cases, the protection code control unit 1 may include a second protection code setting unit 1B. In embodiments described later, a case where a plurality of protection code setting units 1A and 1B are provided and a case where only the first protection code setting unit 1A is provided will be described, respectively.

The first protection code setting unit 1A sets a first protection code BC for every logical block BLK received from the host. The size of logical block BLK is 512 bytes. The host 4 and the flash memory device 2 manage data by the logical block BLK of 512 bytes, respectively. The first protection code BC includes, for example, address information (LA) and a longitudinal redundancy check (LRC). The address information (LA) is calculated from a logical address of data stored in the logical block. The LRC detects errors on data stored in the logical block.

A size of the first protection code is, for example, 8 bytes. The first protection code BC is added to the rear of the logical block BLK. In this way, the logical block BLK of 512 bytes becomes an extended logical block ELK of 520 bytes. The logical block BLK corresponds to a "first logical block," the extended logical block ELK corresponds to a "second logical block."

The second protection code setting unit 1B adds a second protection code FC of 8 bytes to the front of the extended logical block ELK. In this way, the extended logical block ELK becomes a second extended logical block SELK of 528 bytes. That is, the second extended logical block SELK of 528 bytes is generated by adding the protection codes FC and BC of 8 bytes to the front of the logical block BLK of 512 bytes.

The flash memory device 2 is configured with, for example, a NAND flash memory or a NOR flash memory. The flash memory device 2 includes, for example, pages e10, e11, e12, and e13. A page size is set to 512 bytes or n times 512 bytes. On the other hand, a data size for writing in the flash memory device 2 is any one of 520 bytes (in case of ELK) and 528 bytes (in case of SELK). Therefore, data in the same block may be stored in separate pages.

Further, in FIG. 1, data in a plurality of extended logical blocks ELK and SELK having different size is stored in the same flash memory device 2 at the same time for convenience of explanation. However, in actuality, one flash memory device 2 is stored only any one of data in the extended logical block ELK and the second extended logical block SELK.

In the case of the second extended logical block SELK shown in the left side of FIG. 1, the first half of data and the second protection code FC are stored in the page e10, and the second half of data and the first protection code BC is stored in another page e11. The pages e10 is contiguous to the page e11. The first half and second half of data are stored over the plurality of pages e10 and e11 adjacent to a page boundary PB. In the case of the extended logical block ELK shown in the right side of FIG. 1, the first half of data is stored in the page e12, and the second half of data is stored in another page e13 adjacent to the page e12. In this case, the first half and second half of data are also stored over the plurality of pages e12 and e13 adjacent to the page boundary PB.

The flash memory device 2 properly performs a wear leveling 2A. The wear leveling is a process for unifying the number of erasing (the number of writing) of a flash memory chip. The wear leveling 2A copies data written to a page in the flash memory to another page in order to unify the number of erasing.

Therefore, for example, data in the page e11 is copied to another page e110 (not shown), or data in the page e12 is copied to another page e120 (not shown). A controller of the flash memory device 2 (refer to flash memory controller 210 shown in FIG. 4) manages a correspondence relationship between the logical address of data and the physical address in which the data is actually stored. Thus, the flash memory device 2 can read data of a designated logical address from a predetermined page to transmit the data.

A data guarantee unit determines whether or not data is read correctly from the flash memory device 2. In the case of the second extended logical block SELK, the data guarantee unit 3 compares the logical address extracted from the first protection code BC and the logical address obtained from the second protection unit FC, and determines whether or not both logical addresses are identical. When both logical addresses are is identical, the data guarantee unit 3 determines that correct data is read. That is, data read from the flash memory device 2 is guaranteed as correct data by the data guarantee unit 3. When data is guaranteed as correct data, the protection codes BC and FC are removed by the protection code removing unit 1C and the data is transmitted to the host 4.

In the case of the extended logical block ELK, the data guarantee unit 3 compares the first protection code BC(Dn) set in reading target data Dn and the first protection code BC(Dn-1) set in data (Dn-1) preceding to the reading target data Dn.

Although not shown in FIG. 1, if data stored over the pages e12 and e13 is to be the target reading data, another data Dn-1 is stored preceding to the data Dn. The logical addresses of data Dn and Dn-1 are contiguous. Here, the data guarantee unit 3 determines whether or not the logical address extracted from the first protection code BC(Dn) of the reading target data Dn and the logical address extracted from the first protection code BC(Dn-1) set in data Dn-1 preceding to the reading target data Dn are contiguous. When both logical addresses are contiguous, that is, when the logical address of BC(Dn) is larger than the logical address of BC(Dn-1) by one, the data guarantee unit 3 determines that correct data is read from the flash memory.

When there is an error in address management of the flash memory device 2, the data guarantee unit 3 can detect the error by using the above method. Further, the data guarantee unit 3 detects bit change in data by using the LRC included in the first protection code BC.

In this embodiment, data of the logical block BLK read from the flash memory can be determined whether or not the data is correct based on the protection code located before and after the logical block BLK. Thus, in the embodiment, even when the flash memory device 2 performing the wear leveling is used, it is possible to transmit only correct data, so that reliability can be increased.

In the embodiment, the protection code is added to every logical block BLK with respect to data to be written in the flash memory device 2. Therefore, it is possible to read and write data in unit of the logical blocks BLK, and convenience can be increased. Hereinafter, the embodiment will be described in detail.

First Embodiment

Figure 2:
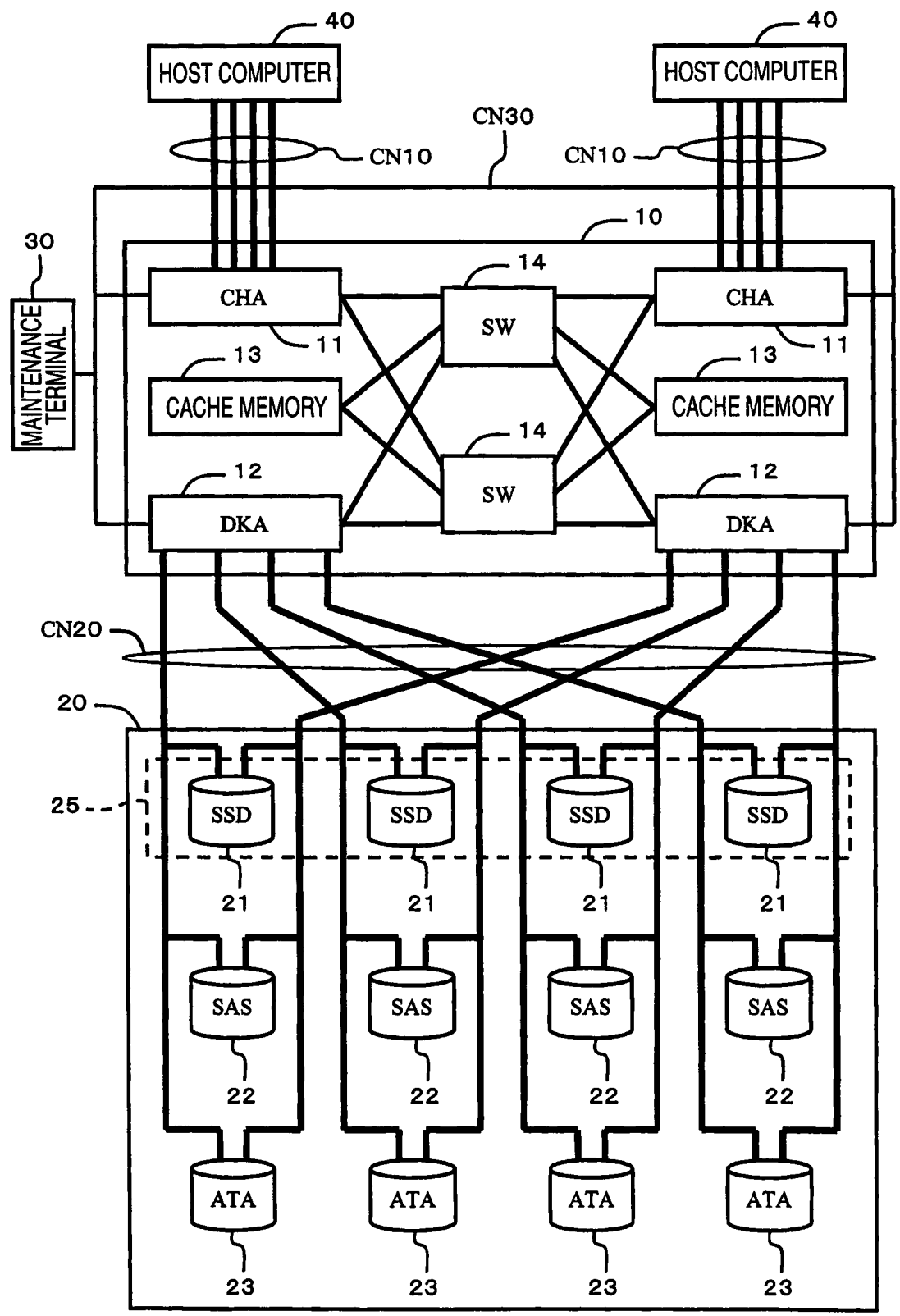
FIG. 2 is an explanatory view illustrating the entire structure of a storage system.

FIG. 2 is an explanatory view illustrating the entire structure of a storage system according to the embodiment. The storage system is provided with, for example, at least one of a storage controller 10, at least one of a memory device loading unit 20, at least one of a maintenance terminal 30, and at least one of a host 40.

The host 40 corresponds to the host 4 shown in FIG. 1 and the flash memory device (hereinafter, referred to as SSD) 21 corresponds to the flash memory device 2 shown in FIG. 1. The first protection code setting unit 1A and the second protection code setting unit 1B is implemented by a storage controller 10.

The host 40 and the storage controller 10 are connected to communicate with each other via a communication path CN10, and the storage controller 10 and the memory device loading unit 20 are connected to communicate with each other via a communication path CN20. Each communication path CN10 and CN20 includes, for example, IP_SAN using IP (Internet Protocol), or FC_SAN using FCP (Fibre Channel Protocol).

The maintenance terminal 30 is connected to each CHA 11 and each DKA 12 in the storage controller 10 via a communication network CN30 such as LAN (Local Area Network). The maintenance terminal 30 collects information on various states in the storage controller 10 and can display the information on a terminal screen. Further, the maintenance terminal 30 assigns various instructions to storage controller 10 so as to change settings etc.

The host 40 includes, for example, a server computer, a workstation, and a mainframe computer. The host 40 uses data stored in the memory device loading unit 20 via the storage controller 10.

The storage controller 10 controls data reception between the host 40 and each memory device 21, 22, and 23 loaded in the memory device loading unit 20. The storage controller 10 is provided with, for example, a plurality of channel adapters 11, a plurality of disk adapters 12, a plurality of cache memories 13, and a plurality of interconnection switches 14. Hereinafter, the channel adapter is referred to as a CHA, and the disk adapter is referred to as a DKA. Since the storage controller 10 is provided with a plurality of each circuit 11, 12, 13, and 14, redundancy is ensured and reliability is increased.

The CHA 11 is an electronic circuit for controlling data communication with the host 40. The DKA 12 is an electronic circuit for controlling data communication with the memory devices 21, 22, and 23. The cache memory 13 is used for transferring data between the CHA 11 and the DKA 12. Further, the cache memory 13 is stored with, for example, information on where the memory device is loaded, information on that which logical volume is used for which host 40, and management information and control information.

The interconnection switch (SW in the figure) 14 is served as a device for interconnecting among each CHA 11, each DKA 12, and each cache memory 13. For example, when processing a write command, the CHA 11 transmits writing data received from the host 40 to the cache memory 13 via the switch 14. The DKA 12 reads the writing data from the cache memory 13 via the switch 14 and writes it to any one of the memory devices 21 to 23. On the contrary, when processing a read command, the DKA 12 transmits the data read from any one of the memory devices 21 to 23 to the cache memory 13 via the switch 14. The CHA 11 reads the data from the cache memory 13 via the switch 14 and transmits the data to the host 40.

For example, the first protection code is added to the rear of the logical block BLK by the CHA 11 and the second protection code is added to the front of the logical block BLK by the DKA 12. Further, a dedicated circuit for generating each protection code BC and FC to be added to logical block BLK may be provided in the storage controller 10.

The memory device loading unit 20 can include a plurality of the memory devices 21, 22, and 23 in difference types. For example, the first memory device 21 includes the SSD. The second memory device 22 includes a serial attached SCSI (SAS) device. The third memory device 23 includes an AT attachment (ATA) device. Since the present invention relates to the memory device 21 performing the wear leveling, hereinafter, the SSD 21 will be described in detail. The memory device loading unit 20 may be configured to load only the SSD 21. Further, so long as the memory device is rewritable and performs the wear leveling, the present invention may be applied to a case even where another memory device is used instead of the SSD.

As shown in FIG. 2, an RAID group 25 can be configured by grouping a plurality of SSDs 21. One or a plurality of logical volumes can be generated by using memory regions of the RAID group 25. This logical volume is provided at the host 40 by being associated with a communication part of the CHA 11 etc. The host 40 indicated the logical address for the logical volume and requests for reading/writing the data.

Figure 3:
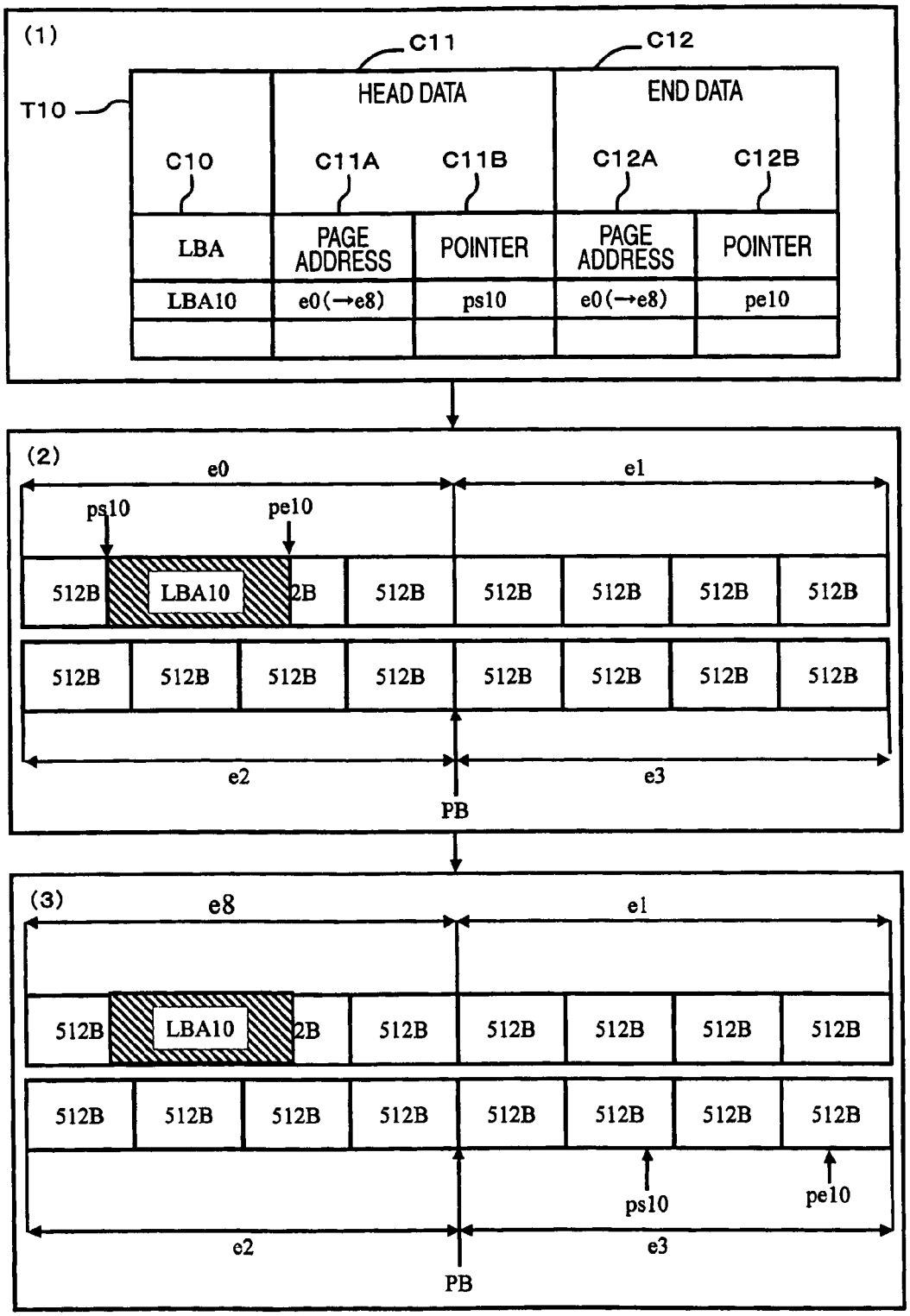
FIG. 3 is an explanatory view schematically illustrating an outline of a wear leveling.

FIG. 3 is an explanatory view illustrating the wear leveling performed in the SSD 21. The wear leveling is performed, for example, by using an idle state etc. FIG. 3(1) is a view exemplifying a structure of an address management table T10 used in the SSD 21. In the management table T10, the logical address in the logical volume and the physical address in which data of the logical address actually is stored are managed by associating with each other. The management table T10 includes the flash memory controller 210 shown in FIG. 4.

The management table T10 includes, for example, an entry C10 for managing the logical address, an entry C11 for managing a position of the head data of the logical address data, and an entry C12 for managing a position of the end data of the logical address data. The entry C11 for managing a position of the head data includes an entry C11A for specifying an address of a page which has the head data and an entry C11B for specifying a pointer which indicates a location in the page. Similarly, the entry C12 for managing a position of the end data of the logical address also includes an entry C12A for specifying an address of a page which has the end data and an entry C12B for specifying a pointer which indicates a location in the page.

As shown in FIG. 3(2), data of a logical address LBA10 is stored in a region indicated from the head pointer ps10 of a page e10 to the end pointer pe10 of the same page e10 in a chip 211 of the SSD 21. The chip 211 includes a plurality of blocks of 512 bytes. In the example of FIG. 3, each page is configured with four blocks. Thus, a page size of the illustrated example is 2048 bytes.

As shown in FIG. 3(3), in order that the flash memory controller 210 unifies the number of erasing (the number of writing), data of the LBA10 is moved from the original storage location to another storage location. In the example shown in FIG. 3, the data of the LBA10 is moved from a page e3 to a page e8. This physical change of the storage location is recoded in the management table T10.

Figure 4:
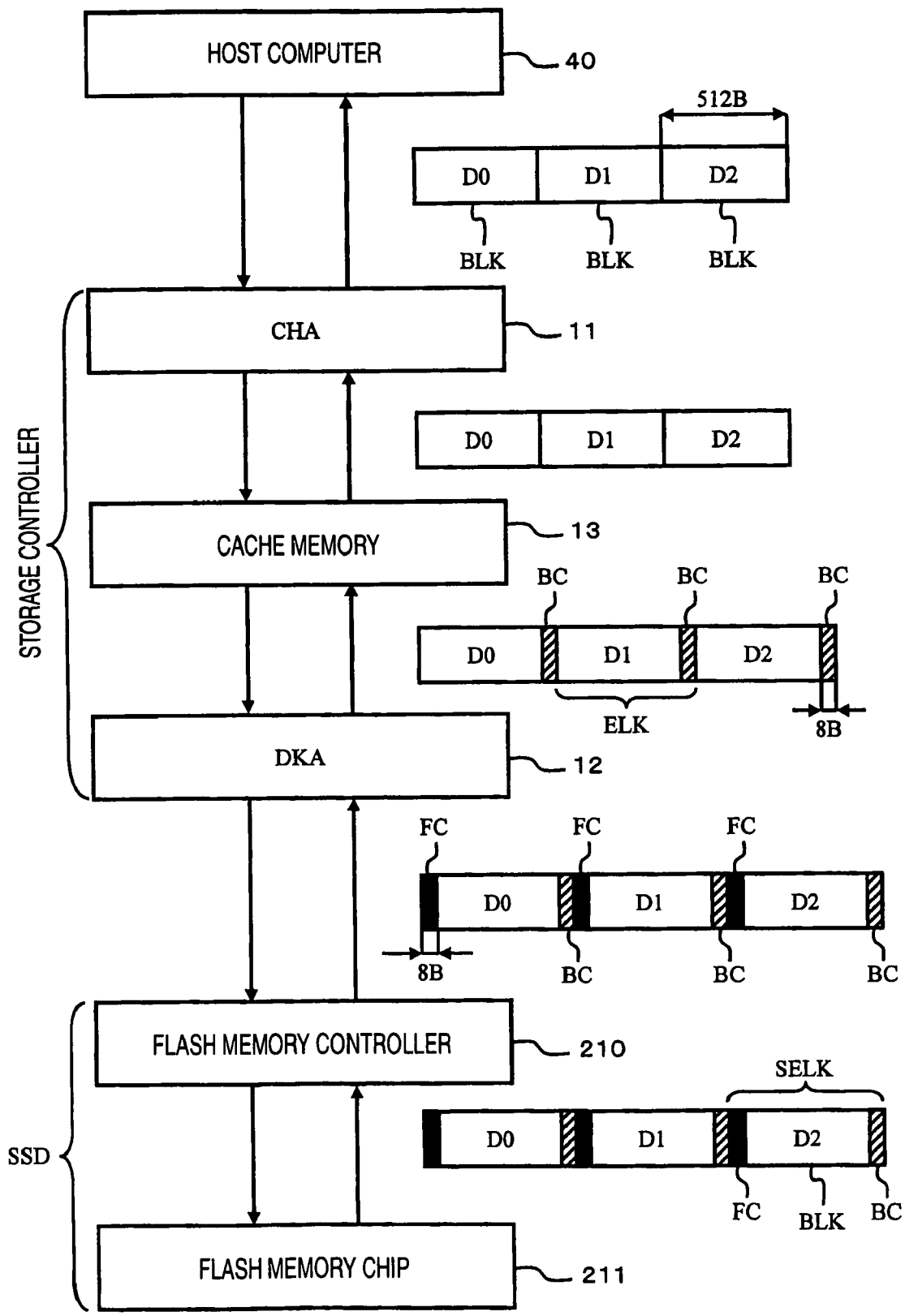
FIG. 4 is an explanatory view illustrating a structure of logical block and data flow from a host to a flash memory device via a storage controller.

FIG. 4 is an explanatory view schematically illustrating a block structure used on a path from the host 40 to the SSD 21. The host 40 and the CHA 11 transmit/receive data by using the logical block BLK of 512 bytes. Writing data is stored in one or a plurality of logical blocks BLK and is transmitted from the host 40 to the CHA 11.

The CHA 11 transmits the received writing data to the cache memory 13. When the writing data is stored in the cache memory 13, the first protection code BC is added to the end of each logical block BLK. In the cache memory 13, the first protection code BC may be added to each logical block BLK. Alternatively, a dedicated circuit for adding the first protection code BC to the logical block BLK may be provided between the CHA 11 and the cache memory 13.

In the first protection code BC, a plurality of information is included. One part of information is address data (LA) generated based on the logical address of the logical block BLK. The other part of information is checking data (LRC) for checking whether or not there is an error in data of the logical block BLK. The size of first protection code BC is, for example, 8 bytes. The logical block BLK of 512 bytes is added with the first protection code BC of 8 bytes, so that the extended logical block ELK of 520 bytes is generated.

When receiving data of the extended logical block ELK from the cache memory 13, the DKA 12 adds the second protection code FC to the head of each extended logical block ELK. The second protection code FC is configured with the logical address of 8 bytes. That is, the logical address of the logical block BLK included in the extended logical block ELK is used as content of the second protection code FC. By adding the second protection code FC of 8 bytes to the extended logical block ELK of 520 bytes, the second extended logical block SELK of 528 bytes is generated. As a result, the second extended logical block SELK is generated by adding the protection codes FC and BC of 8 bytes to the front and rear of the logical block BLK of 512 bytes, respectively.

The SSD 21 includes the flash memory controller 210 and the flash memory chip 211 controlled by the flash memory controller 210. Data is stored in the flash memory chip 211. The flash memory chip 211 includes a plurality of pages. Each page is configured with one or more blocks. A block size is 512 bytes.

The flash memory controller 210 receives data configured with one or a plurality of second extended logical block SELK from the DKA 12. The flash memory controller 210 stores the second extended logical block SELK in a page of the flash memory chip 211. In this way, the writing data received from the host 40 is added with the protection codes BC and FC for every logical block BLK and is written in one or more pages of the flash memory chip 211.

When the host 40 issues a read command, the CHA 11 receives the read command and informs to the DKA 12. The DKA 12 indicates the logical address and requests the flash memory controller 210 to read data. When being requested for the data received from the DKA 12, the flash memory controller 210 reads the data from a page in the flash memory chip 211 by using the management table T10.

When receiving the data added to the protection codes BC and FC, the DKA 12 determines whether or not the logical address extracted from the first protection code BC is identical to the logical address representing the second protection code FC. When both logical addresses are identical, the DKA 12 removes the second protection code FC from the data and transmits the data to the cache memory 13. The CHA 11 reads the data from the cache memory 13, removes the first protection code BC from the data, and transmits the data to the host 40. Alternatively, the DKA 12 may remove the protection codes BC and FC from the data, respectively, and transmit the data to the cache memory 13.

Figure 5:
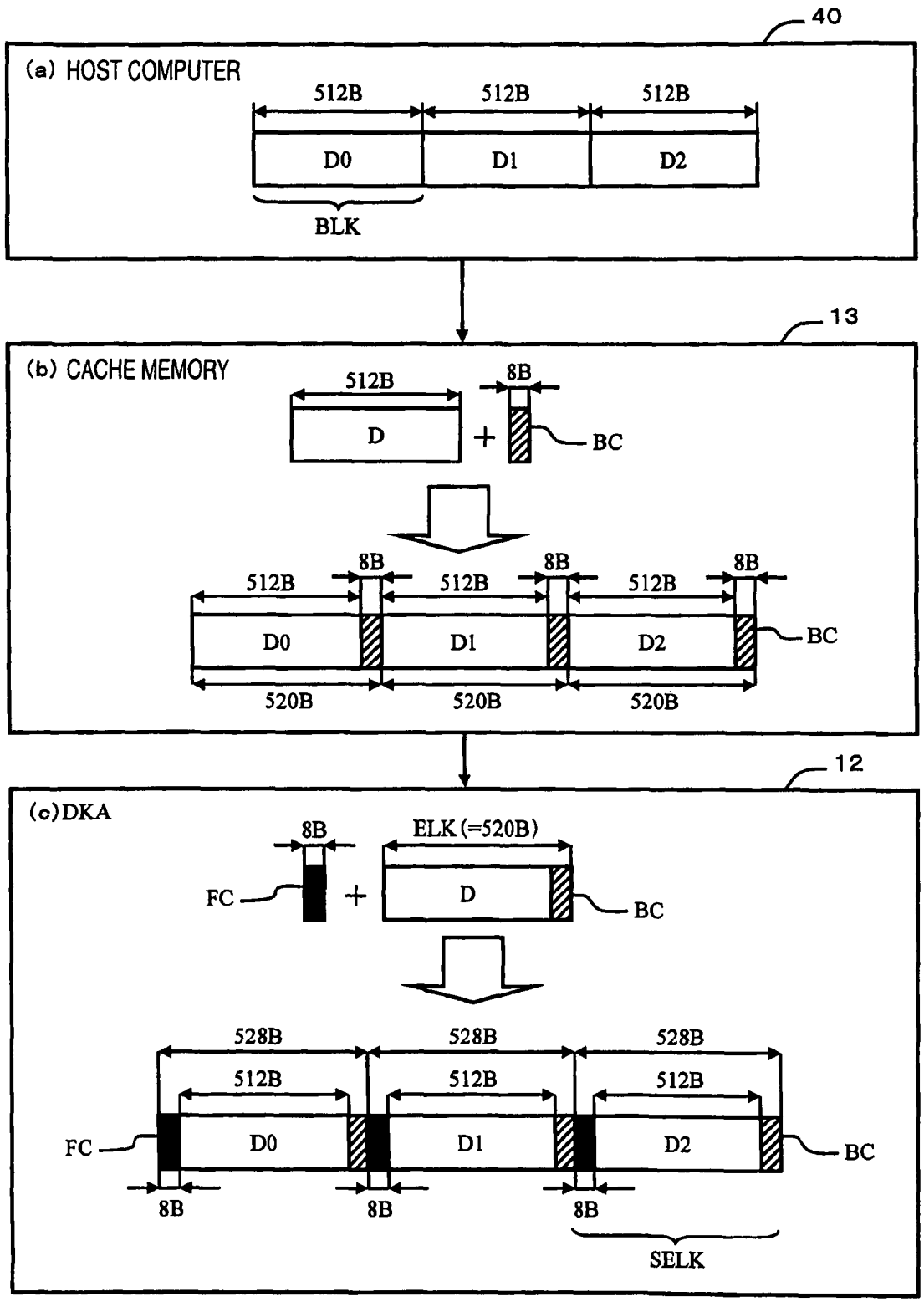
FIG. 5 is an explanatory view illustrating that a protection code is set before and after a logical block.

FIG. 5 is an explanatory view illustrating a structure of each block BLK, ELK, and SELK. As described above, the host 40 transmits writing data to the storage controller 10 in unit of the logical blocks BLK of 512 bytes (FIG. 5(a)).

As shown in FIG. 5(b), the storage controller 10 adds the first protection code BC of 8 bytes to the end of the logical block BLK of 512 bytes. The first protection code BC includes address information generated based on the logical address of the logical block BLK and checking data calculated from data of the logical block BLK. By adding the first protection code BC to the logical block BLK, the extended logical block ELK of 520 bytes are generated.

As shown in FIG. 5(c), the DKA 12 adds the second protection code FC of 8 bytes to the head of the extended logical block ELK of 520 bytes. In this way, the second extended logical block SELK of 528 bytes is generated. The second protection code FC is configured with the logical address of the logical block BLK included in the extended logical block ELK.

Figure 6:
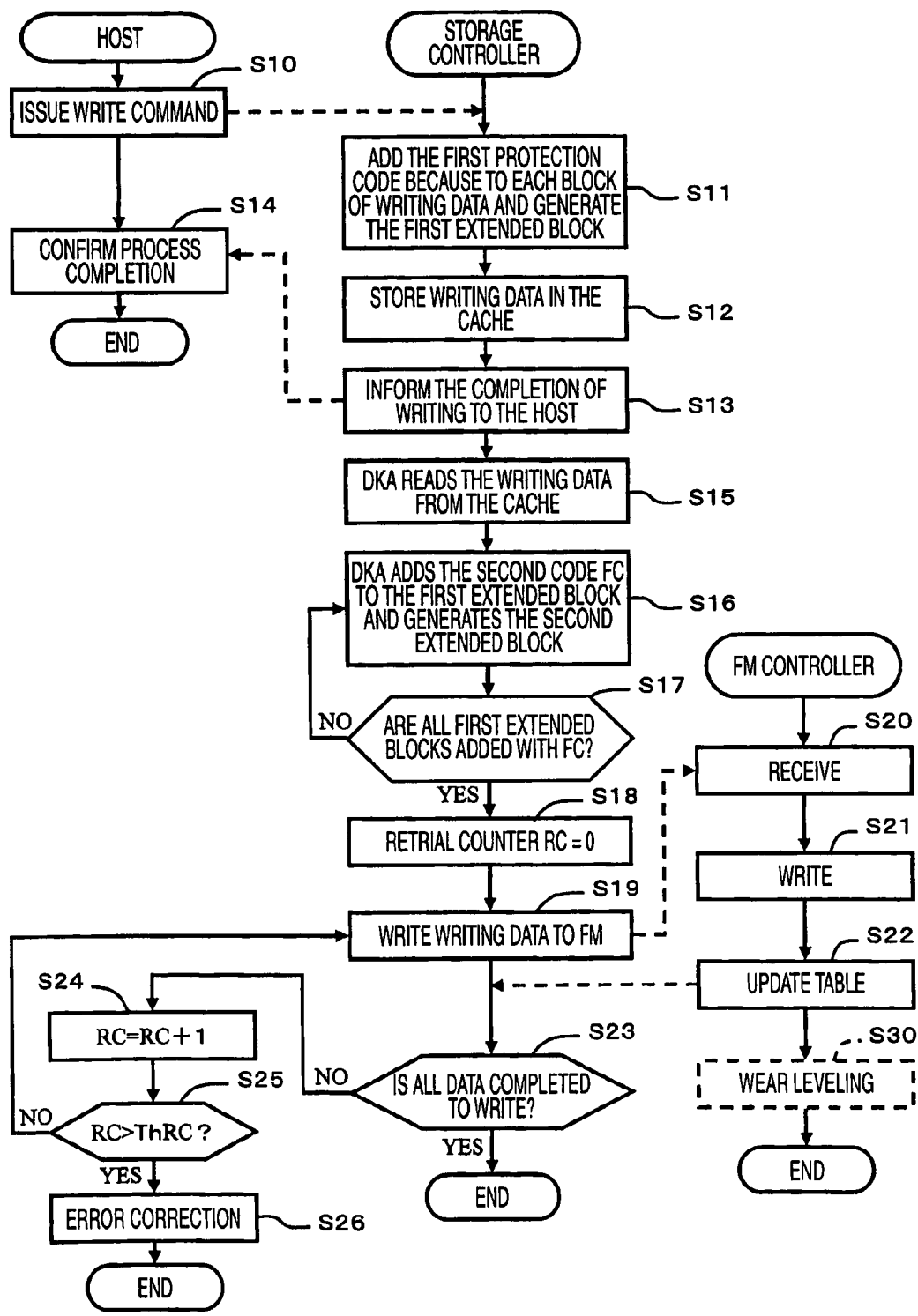
FIG. 6 is a flowchart illustrating a writing process.

Now, a processing method of a write command will be described with reference to FIG. 6. Further, for convenience of explanation, the protection code, the logical block, the cache memory, and the flash memory are abbreviated to a code, a block, a cache, and a FM, respectively in the flowchart.

When the host 40 issues the write command (S10), the storage controller 10 adds the first protection code BC to each logical block BLK for the writing data received from the host 40 and converts the data into the extended logical block ELK (S11).

The storage controller 10 stores the writing data converted into data in unit of the extended logical blocks ELK in the cache memory 13 (S12) and informs to the host 40 on writing completion (S13). The host 40 confirms the completion of a writing process (S14) by receiving the notice.

When the writing data is stored in the cache memory 13, the process completion of the write command is reported to the host 40. Therefore, a writing performance can be improved for the host 40. This method is referred to as an asynchronous process. On the contrary, it is referred to as a synchronous process in which the writing process completion is informed to the host 40 when the writing data is actually written in the SSD 21. Either method may be employed.

The storage controller 10 performs a destage process at a proper timing. The destage process refers to a process in which data stored only in the cache memory 13 is written into the memory device (SSD 21 in the embodiment). Since the destaged data is backed up by the SSD 21, it may be erased from the cache memory 13.

When the destage process is started, the DKA 12 reads the writing data from the cache memory 13 (S15). The writing data is configured with one or more extended logical blocks ELK. The DKA 12 adds the second protection code FC to the head of the extended logical block ELK and converts into the writing data of the second extended logical block SELK (S16, S17). When the second protection code FC is added to each extended logical block ELK of the writing data (YES in S17), the DKA 12 resets a retrial counter RC (S18) and writes the writing data to the FM (that is, SSD 21) (S19).

When receiving the writing data from the DKA 12 (S20), the FM controller 210 writes the writing data to a page of the FM chip 211 and updates the management table T10 (S22). The FM controller 210 reports the writing completion to the DKA 12. Further, as described with reference to FIG. 3, the FM controller 210 performs the wear leveling (S30), for example, by judging a predetermined timing of an idle state etc.

The DKA 12 determines whether or not the writing of all writing data is completed (S23). That is, the DKA 12 determines whether or not the destage process is completed (S23). When all writing data is written to the SSD 21 (YES in S23), this process is completed.

When the writing to the FM (SSD 21) is failed (NO in S23), the DKA 12 increases the retrial counter RC by one (S24) and determines whether or not a predetermined threshold value ThRC is exceeded (S25). Until a value of the retrial counter RC exceeds the predetermined threshold value ThRC (NO in S25), the DKA 12 tries to write the writing data to the FM (S19). When the value of the retrial counter RC is more than the predetermined threshold value ThRC (YES in S25), the DKA 12 performs a predetermined error correction process (S26). The error correction process performs, for example, a process in which a path for accessing the SSD 21 is exchanged for an alternative path (sub-path) from a main path.

Figure 7:
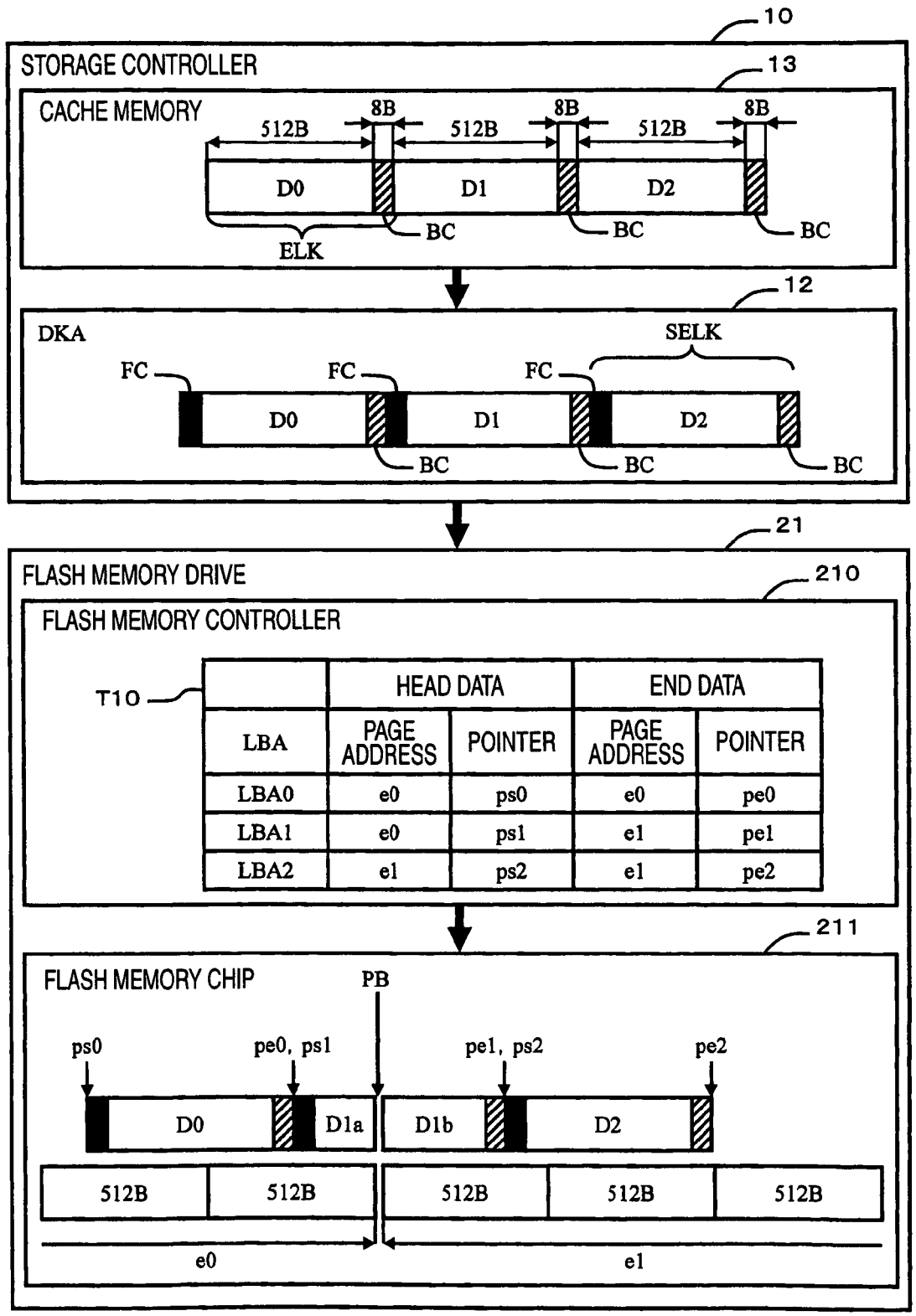
FIG. 7 is an explanatory view illustrating an outline of a writing process.

FIG. 7 is an explanation view illustrating a state of the storage controller 10 writing data in the SSD 21. As described above, the storage controller 10 adds the protection codes FC and BC to the front and rear of the logical block BLK and generates the second extended logical block SELK of 528 bytes.

When receiving the writing data in unit of the SELK from the DKA 12, the FM controller 210 writes the writing data to a page in the FM chip 211. The FM controller 210 registers a correspondence relationship between the logical address of the writing data and the physical address in the FM chip 211 at the management table T10.

In the example shown in FIG. 7, the logical block SELK including data D0 is stored from a pointer ps0 to a pointer pe0 of a page e0. Since the second extended logical block SELK has a size of 528 bytes, two blocks in the page are used.

Similarly, the logical block SELK including data D1 is stored in a region from the pointer ps1 of the page e0 to a pointer pe1 of a page e1. Further, the page e0 is adjacent to the page e1. In addition, since each block SELK is contiguously written, the pointer pe0 and the pointer pe1 indicate the same location. The logical block SELK including data D2 is stored in a region from a pointer ps2 of the page e1 to a pointer pe2 of the page e1.

Figure 8:
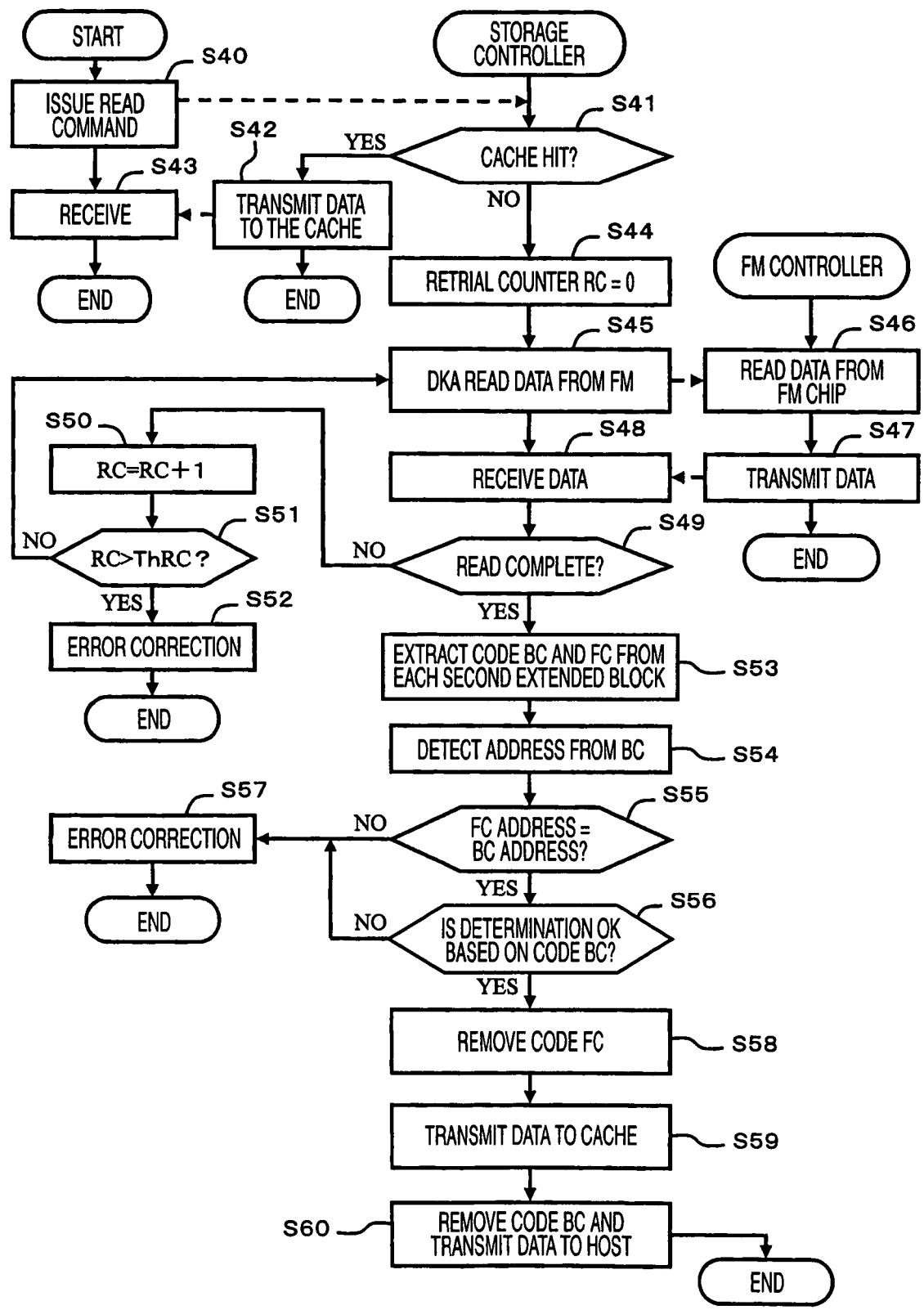
FIG. 8 is a flowchart illustrating a reading process.

A processing method of the read command will be described with reference to FIG. 8. When the host 40 issues the read command (S40), the CHA 11 of the storage controller 10 determines whether or not there is requested data (reading data) in the cache memory 13 (S41). When the requested data is stored in the cache memory 13 (YES in S41), the CHA 11 reads the data from the cache memory 13 and transmits the data to the host 40 (S42). The host 40 receives the data from the CHA 11 (S43).

When the there is no data requested from the host 40 in the cache memory 13 (NO in S41), the storage controller 10 reads data from the SSD 21. First, the DKA 12 resets the retrial counter RC (S44) and reads the requested data of the host 40 from the SSD 21 (S45).

The FM controller 210 reads the data from a page in the FM chip 211 according to the instruction of the DKA 12 (S46). The FM controller 210 confirms where the data of the requested logical address is located in a page of the FM chip 211 with reference to the management table T10 based on the logical address instructed from the DKA 12. Further, the FM controller 210 transmits the data read from the FM chip 211 to the DKA 12 (S47).

The DKA 12 determines whether or not the data is completely read from the SSD 21 (S49). When it is not completed (NO in S49), that is, when it is failed to read data from the SSD 21 (NO in S49), the DKA 12 increases the value of retrial counter RC by one (S50). The DKA 12 tries to read data from the SSD 21 (S45) until the value of retrial counter RC exceeds a predetermined threshold value ThRC (NO in S51) and the DKA 12 performs, for example, an error correction process such as exchanging for alternative path (S52) when the value of retrial counter RC exceeds a predetermined threshold value ThRC (YES in S51).

When it is successful to read data from the SSD 21 (YES in S51), the DKA 12 extracts the first protection code BC and the second protection code FC with respect to each second extended logical block SELK in the reading data (S53). The DKA 12 detects the logical address from address information included in the first protection code BC (S54).

The DKA 12 determines whether or not the logical address obtained from the first protection code BC (denoted by "BC address" in the figure) and the logical address obtained from the second protection code FC (denoted by "FC address" in the figure) (S55).

When both logical addresses are identical (YES in S55), the DKA 12 determines whether or not there is an error in data based on the checking data (LRC) included in the first protection code BC (S56). When there is not an error in data (YES in S56), the DKA 12 removes the second protection code FC included in the data read from the SSD 21 (S58) and transmits the data to the cache memory 13 (S59). The CHA 11 transmits the data removed by the first protection code BC to the host 40 (S60).

On the other hand, there is a case where the logical address obtained from the first protection code BC is not identical to the logical address obtained from the second protection code FC (NO in S55). For example, there is a case where the correspondence relationship between the logical address and the physical address is not correctly managed by the wear leveling performed in the SSD 21.

When both logical addresses are not identical (NO in S55), the DKA 12 performs a predetermined error correction process (S57). For example, when the read target logical volume has a redundancy such as an RAID1 or RAID5 etc., the DKA 12 restores the data requested from the host 40 by performing a correction copy etc (S57).

When a bit error in the logical block is detected by the checking data included in the first protection code BC (NO in S56), the DKA 12 restores the bit error based on the checking data (S57). When the error cannot be corrected by the checking data, the correction copy and the like are performed.

Figure 9:
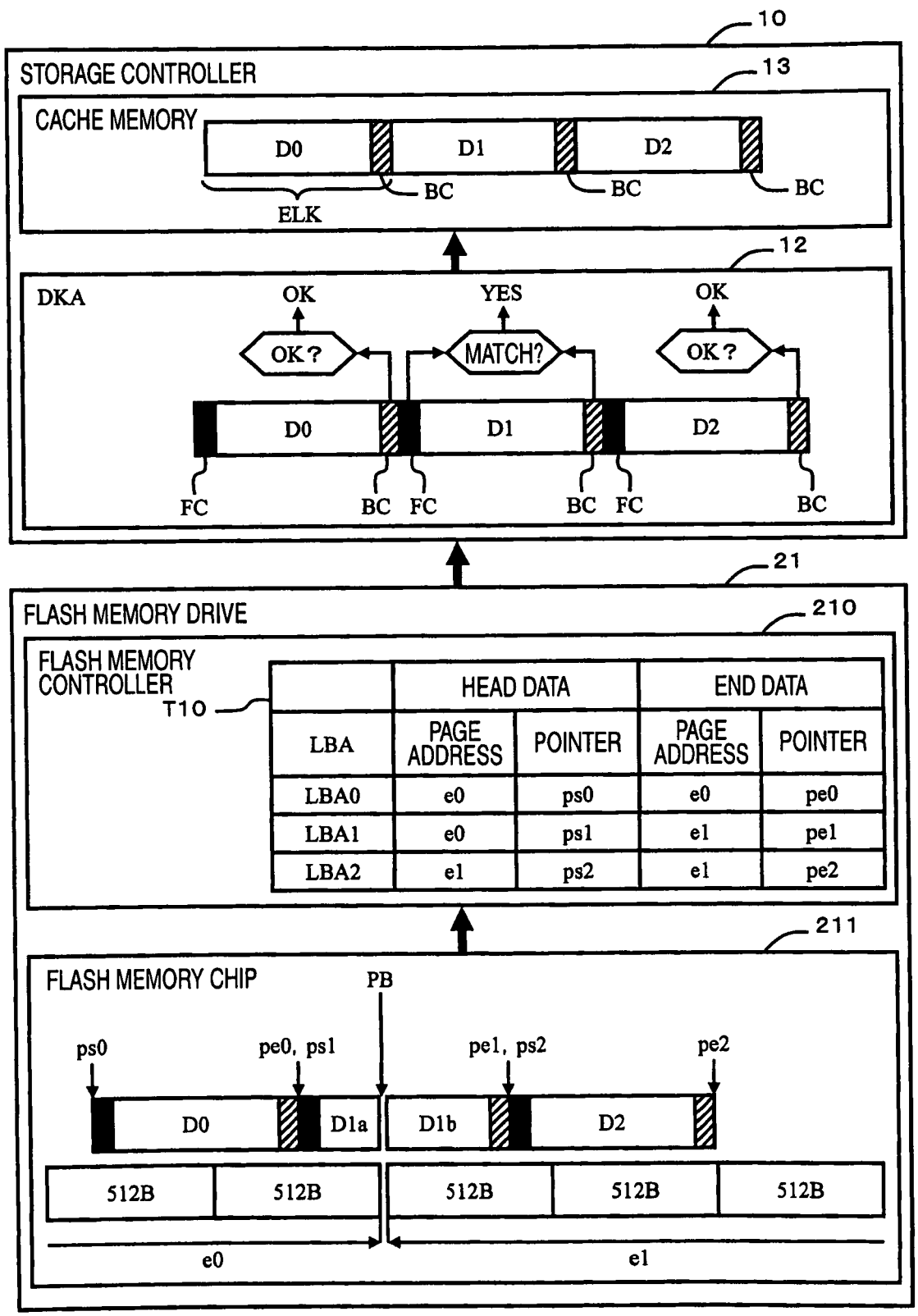
FIG. 9 is an explanatory view illustrating an outline when a reading process is normally performed.
Figure 10:
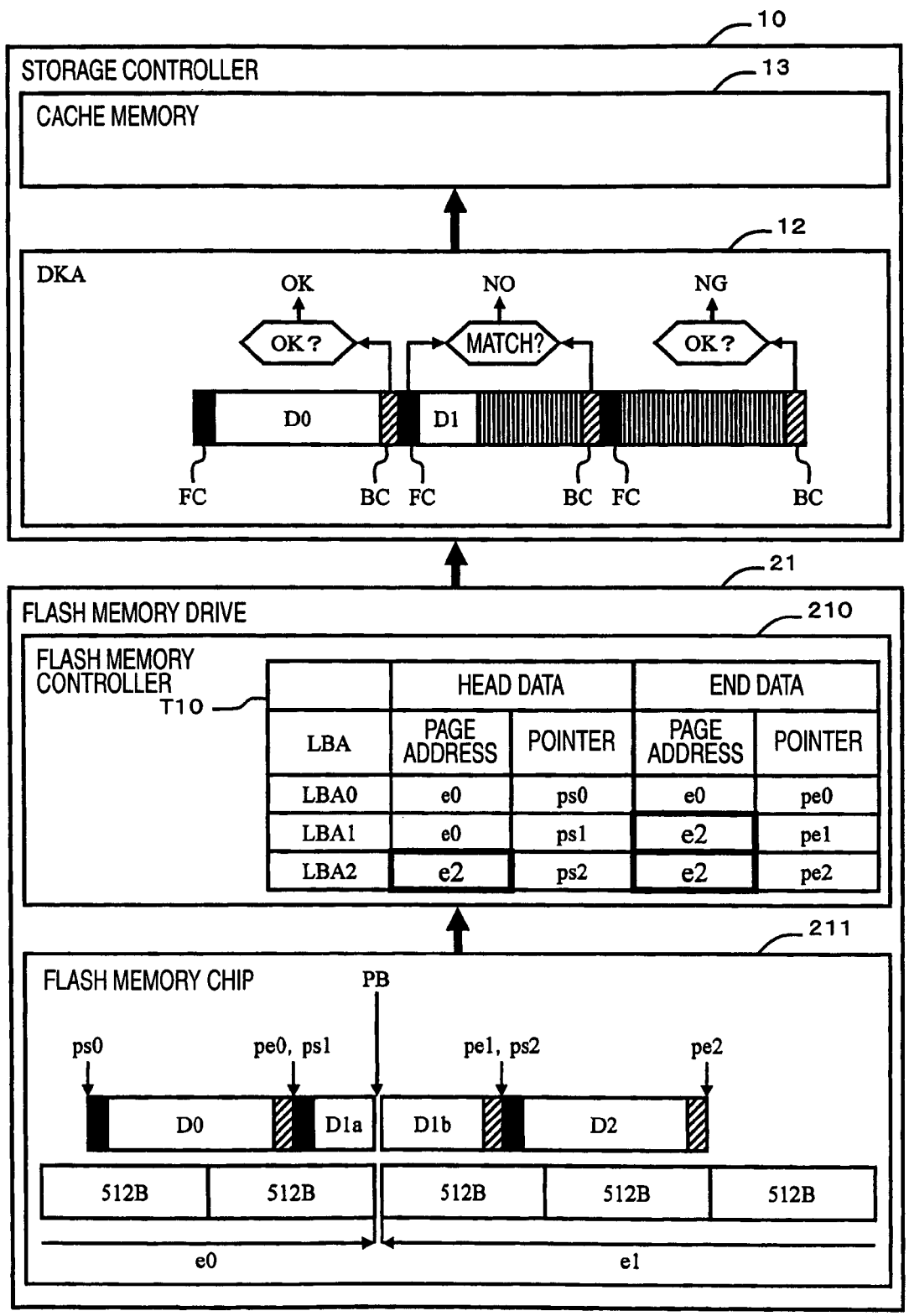
FIG. 10 is an explanatory view illustrating an outline when a reading process is not performed correctly.

A reading process will be described with reference to FIGS. 9 and 10. FIG. 9 is an explanatory view illustrating the case where data can be correctly read from the SSD 21. FIG. 10 is an explanatory view illustrating the case where error data is read from the SSD 21.

Assume that the first half of data D1a is stored in the page e0 and the second half of data D1b is stored in the page e1 in data D1. Data stored in the same page is handled together in the SSD 21. However, as in the case of the data D1, when data is stored over a plurality of pages e0 and e1, it is likely that error data is read by an address management error in the SSD 21.

In the embodiment, the first protection code BC for specifying the logical address is added to the end of logical block BLK and the second protection code FC for specifying the logical address is also added to the head of logical block BLK.

In this way, when the logical address obtained from the first protection code BC and the protection code obtained from the second protection code FC are identical, the DKA 12 can determine that correct data is read from the SSD 21.

Further, a process for comparing the logical address obtained from the first protection code BC and the logical address obtained from the second protection code FC can be performed for all logical blocks or for only logical block stored over a plurality of pages. When the DKA 12 knows that there is the logical block stored over a plurality of pages, the process can be performed.

In FIGS. 9 and 10, for only logical block stored over a plurality of pages, the protection codes BC and FC are compared. For other logical blocks, only checking is performed based on the checking data in the first protection code BC. However, this is exemplified for description, and comparison between each protection code BC and FC and checking based on the checking data can be performed for each logical block.

As shown in FIG. 10, the case where there is an error in managing a correspondence relationship between the logical address and the physical address in the SSD 21 can be considered. For example, it can be seen in the management table T10 that data of the page e1 moves to the page e2 but, in actuality, it is not. That is, the case where data of the page e1 is still stored in the page e1 can be considered.

In this case, when the DKA 12 requests for the FM controller 210 data of a logical address LBA1, the FM controller 210 reads data D1a stored in the page e0 and data stored in the page e2 and transmits the data to the DKA 12. However, the second half D1b of the logical address LBA1 is not presented in the page e2 but in the page e0. Thus, data (corresponding to D1b) read from the page e2 among data transmitted to the DKA 12 has an error. By comparing the logical addresses obtained from each protection code FC and BC, the DKA 12 can determine whether or not data is read as it expected.

In this embodiment as configured above, the protection codes FC and BC for specifying the logical address are added to both front and rear of the logical block. Thus, according to the embodiment, it can be determined whether or not correct data is read by comparing the logical addresses obtained from each protection codes, so that reliability can be increased.

In the embodiment, since the protection codes FC and BC are added to each logical block, even when data is read in unit of the logical blocks, it is possible to determine whether or not the logical address of the logical block is correct. Therefore, it is possible to read and write data in unit of the logical blocks, and convenience is increased.

Second Embodiment

A second embodiment will be described with reference to FIGS. 11 to 14. Each embodiment including the second embodiment corresponds to a modified example of the above-mentioned first embodiment. Thus, in this embodiment, the description will focus on a difference from the first embodiment. In this embodiment, it will be described the case where a page size is set to 512 bytes as same with that of the logical block BLK. Further, a flowchart of the embodiment will be described later with a third embodiment.

Figure 11:
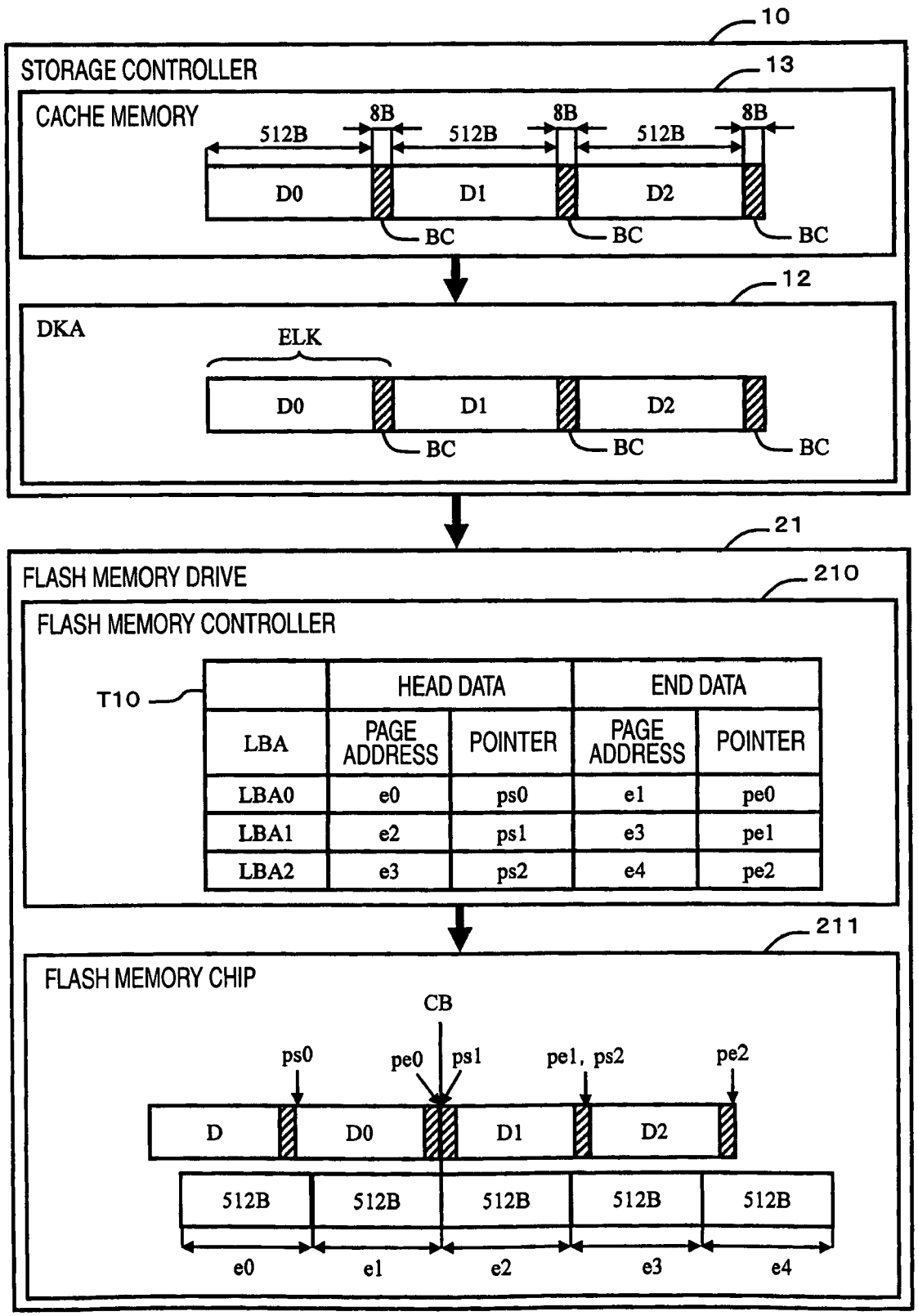
FIG. 11 is an explanatory view illustrating a process for writing data of a storage system according to a second embodiment.

FIG. 11 is an explanatory view illustrating a relationship a data configuration used in the storage controller 10 and a data configuration used in the SSD 21. As shown in lower part of FIG. 11, one page is configured with one block, and the page size is 512 bytes.

A block size input to the SSD 21 is 520 bytes and the page size in the SSD 21 is 512 bytes. Thus, data of 64 extended logical blocks ELK (=520×64=33280) is equal to data of 65 pages (=512×65=33280). That is, a block boundary between the extended logical blocks ELK and a page boundary between pages are matched at every 64 extended logical blocks ELK. In other words, the extended logical block ELK boundary and the page boundary are matched corresponding to the least common multiple of 512 bytes and 520 bytes. In the embodiment, the boundary at which the extended logical block boundary and the page boundary are matched is referred to as a common boundary CB. In the embodiment, the protection code BC preceding to the common boundary CB is added to the head of the logical block immediately after the common boundary CB.

Figure 12:
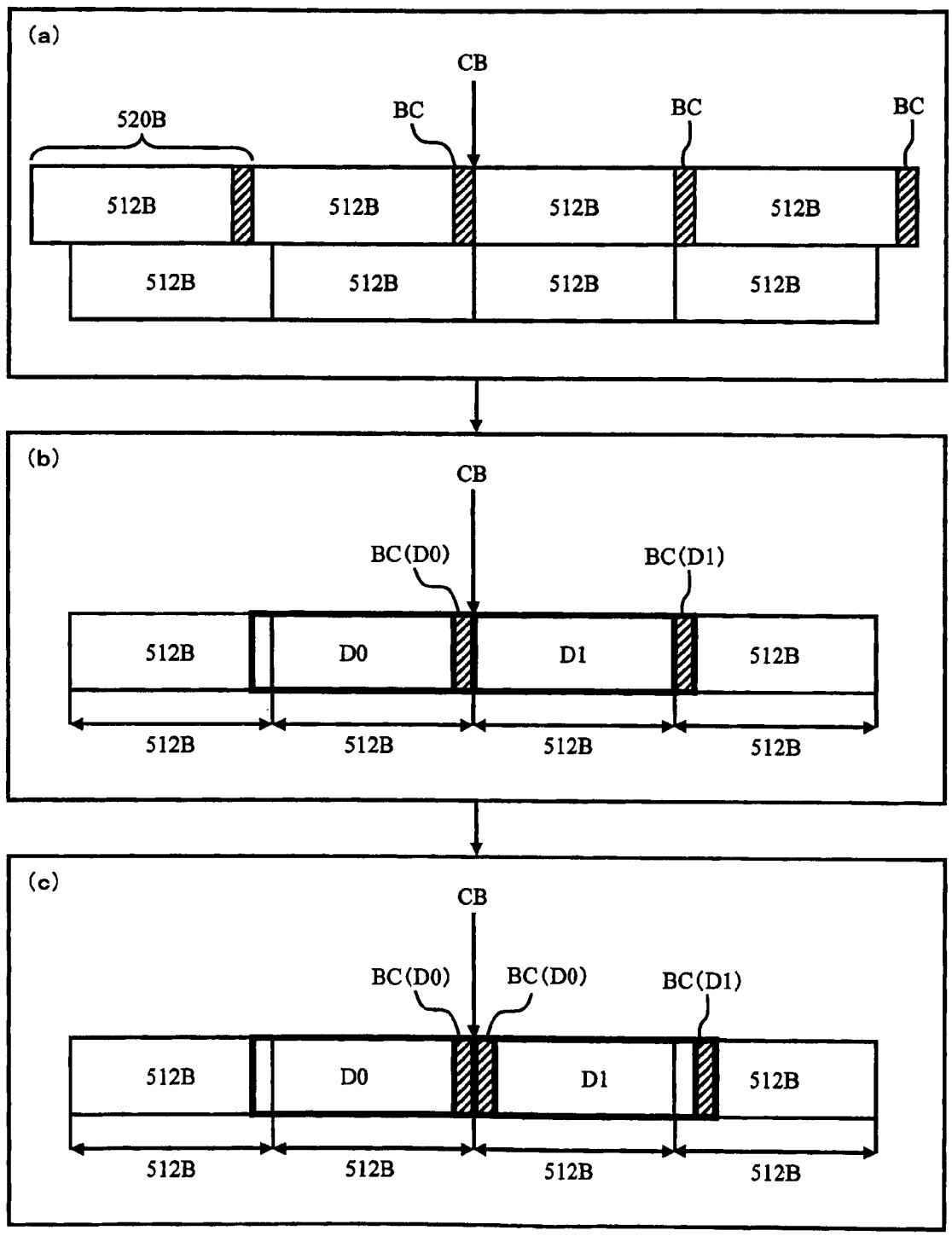
FIG. 12 is an explanatory view illustrating that a protection code in a target page is copied to the head of the next page when a page boundary and a block boundary are matched.

FIG. 12 is an explanatory view, in which the first protection code BC added to the end of the logical block preceding to the common boundary CB is copied and added to the head of the logical block immediately after the common boundary CB.

As shown in FIG. 12(a), the extended logical block boundary and the page boundary are matched at the common boundary CB corresponding to the least common multiple of 512 bytes and 520 bytes. As shown in FIG. 12(b), data D1 of 512 bytes immediately after the common boundary CB is accommodated in one page. That is, in a page immediately after the common boundary CB, only data is stored, but data for determining whether or not the data is correct is not stored. Thus, when an address management error occurs in the SSD 21, even the data D1 is read, it is impossible to determine whether or not the data D1 is correct.

According to the embodiment, as shown in FIG. 12(c), the first protection code BC stored in a location preceding to the common boundary CB is copied to the head of page immediately after the common boundary CB. In other words, the first protection code BC of the previous logical block is added to the head with respect only to the logical block stored in a location immediately after the common boundary CB. This copy process is performed by the FM controller 210.

Figure 13:
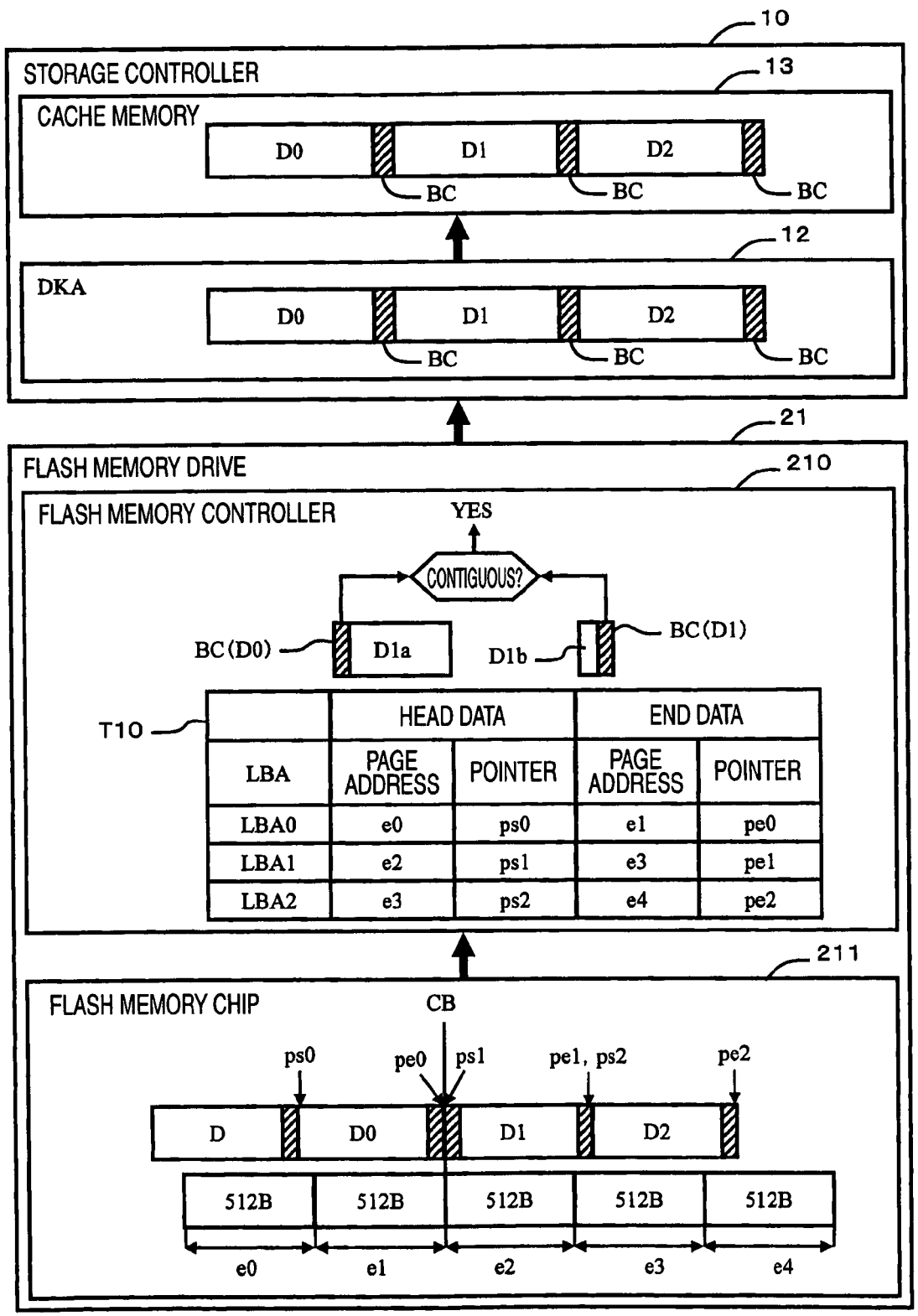
FIG. 13 is an explanatory view illustrating an outline when a reading process is performed correctly.

As shown in the lower side of FIG. 13, according to the copy process, the first protection code BC(D0) of the previous logical block D0 and the first half D1a of the data D1 are stored in the page e2 immediately after the common boundary CB. Further, in the next page e3, the second half D1b of the data D1, the first protection code BC, and another data D2 are stored, respectively.

When the DKA 12 instructs the SSD 21 to read the data D1, the FM controller 210 read the first protection code BC(D0) of the previous logical block D0 and the data D1a from the page e2. Further, the FM controller 210 reads the data D1b and the first protection code BC(D1) from the page e3. The FM controller 210 compares the logical address obtained from the first protection code BC(D0) added to the head of the logical block and the logical address obtained from the first protection code BC(D1) added to the end of the logical block.

That is, the FM controller 210 determines whether or not the logical address obtained from each protection code BC(D0) and BC(D1) is normally contiguous. Since the data D0 is contiguous to the data D1, if the data D1 is normally read, the logical address of the protection code BC(D0) is contiguous to the logical address of the protection code BC(D1). When the both logical addresses are contiguous to each other, the FM controller 210 determines that correct data is read from the FM chip 211 to transmit the data to the DKA 12.

Figure 14:
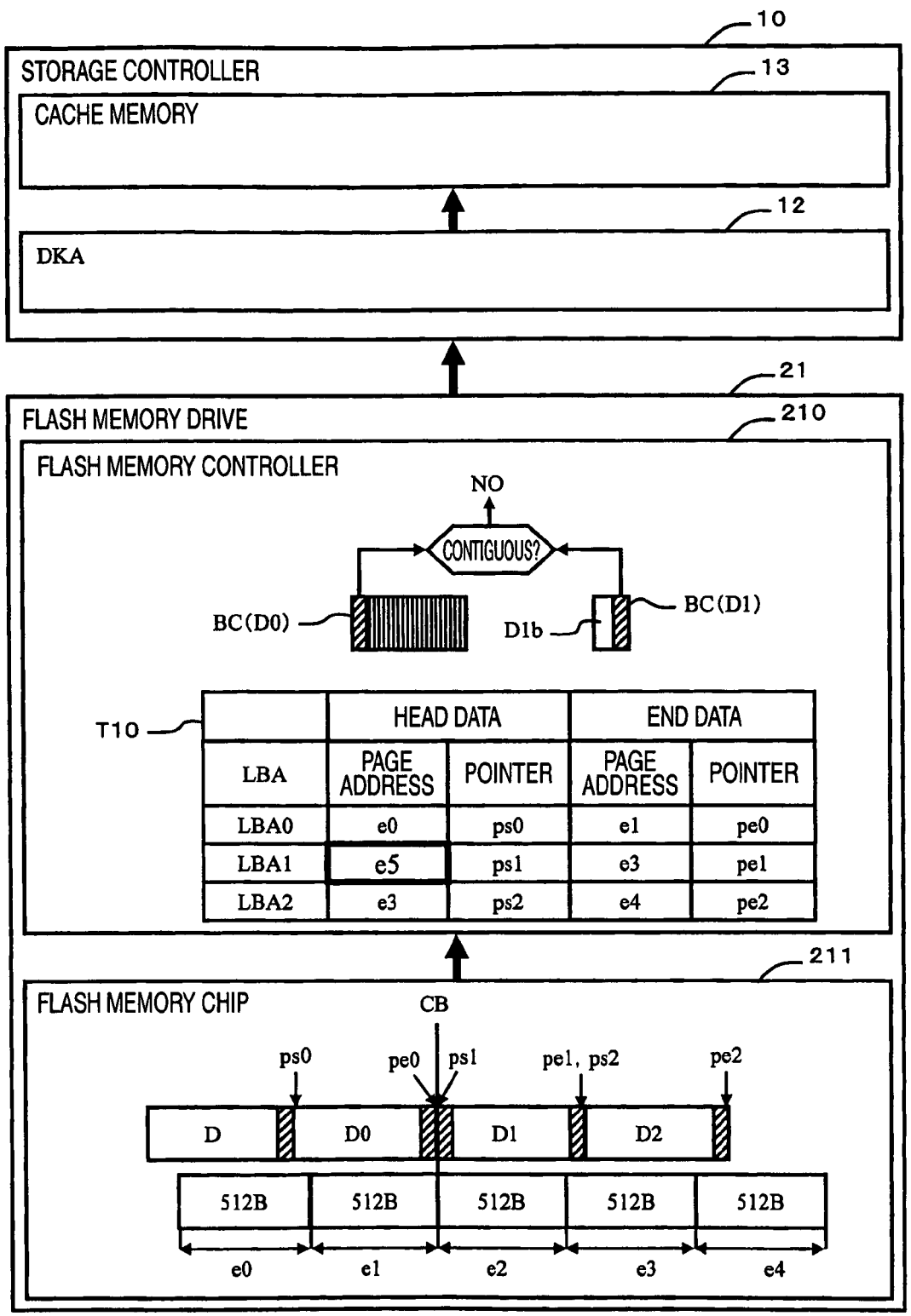
FIG. 14 is an explanatory view illustrating an outline when a reading process is not performed correctly.

FIG. 14 shows the case where an address management error occurs in the SSD 21. In the management table T10 of an example shown in FIG. 14, although data of the page e2 is moved to the page e5, in actuality, data of the page e2 is not moved.

The FM controller 210 reads data from the page e5 and the page e3 and determines whether or not the logical addresses are contiguous. In this case, since the data D1a is not moved to the page e5, the logical address contiguous to the first protection code BC(D1) is not obtained from data of the page e5. Thus, the FM controller 210 determines that reading is failed and informs an error to the DKA 12.

Advantageous effect similar to the first embodiment can be obtained from the embodiment having the above-mentioned structure. Further, in the embodiment, the page size is identical to the size of logical block BLK and the first protection code BC of the previous logical block is added to the head of the logical block immediately after the common boundary CB. Thus, in the embodiment, the second protection code FC of 8 bytes is not required. In addition, since a plurality of first protection codes BC is added only to the particular logical block, as compared with the first embodiment, a memory area of the FM chip 211 can be effectively used. Further, in the embodiment, since the FM controller 210 assures the reliability of data, the reliability and convenience of storage system can be increased without increasing the burden of DKA 12.

Third Embodiment

A third embodiment will be described with reference to FIGS. 15 to 20. In the embodiments, each page has a size of a plurality of blocks, and it is determined whether or not data of a read target is correct by using the first protection code BC added to data preceding to target reading data.

Figure 15:
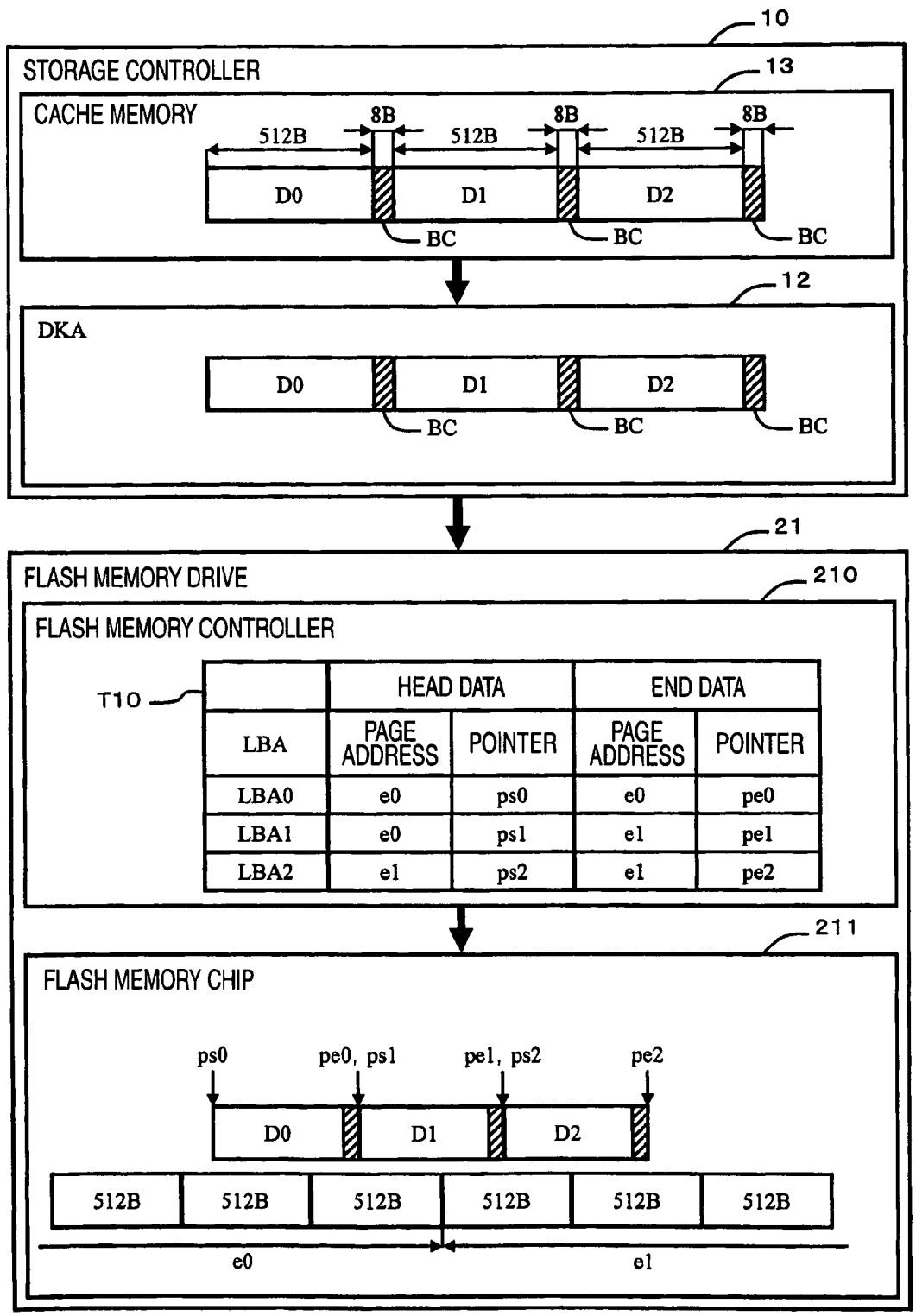
FIG. 15 is an explanatory view illustrating a process for writing data of a storage system according to a third embodiment.

FIG. 15 is an explanatory view illustrating that writing data is stored in the SSD 21. In the embodiment, as with the above embodiments, the first protection code BC is also added to the end of each logical block BLK. In the embodiment, data added with the first protection code BC is stored in the FM chip 211 without any change.

Figure 16:
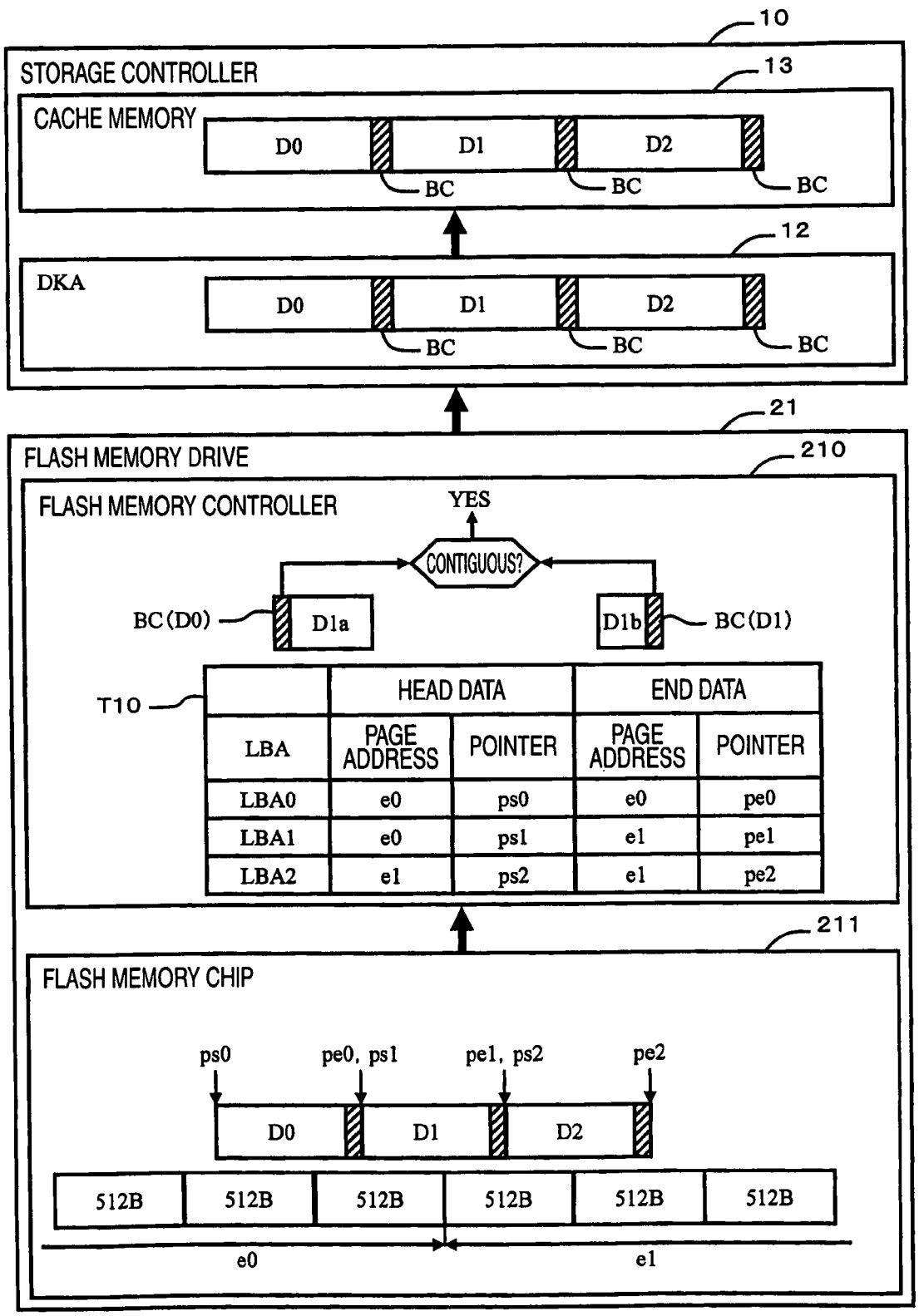
FIG. 16 is an explanatory view illustrating an outline when a reading process is performed correctly.

FIG. 16 is an explanatory view illustrating that data is correctly read from the SSD 21. For example, when the DKA 12 instructs to read the data D1, the FM controller 210 reads the first half D1a of the data D1 and the first protection code BC(D0) added to the data D0 preceding to the data D1 from the page e0. Further, the FM controller 210 reads the second half D1b of the data D1 and the first protection code BC(D1) added to the data D1 from the page e1.

The FM controller 210 compares the logical address obtained from the first protection code BC(D1) added to the data D1 of a read target and the logical address obtained from the first protection code BC(D0) added to the data D0 preceding to the data D1 of a read target, so as to determine whether or not the both logical addresses are normally contiguous. Here, being normally contiguous means that succeeding logical address is more increased by predetermined number than preceding logical address.

Figure 17:
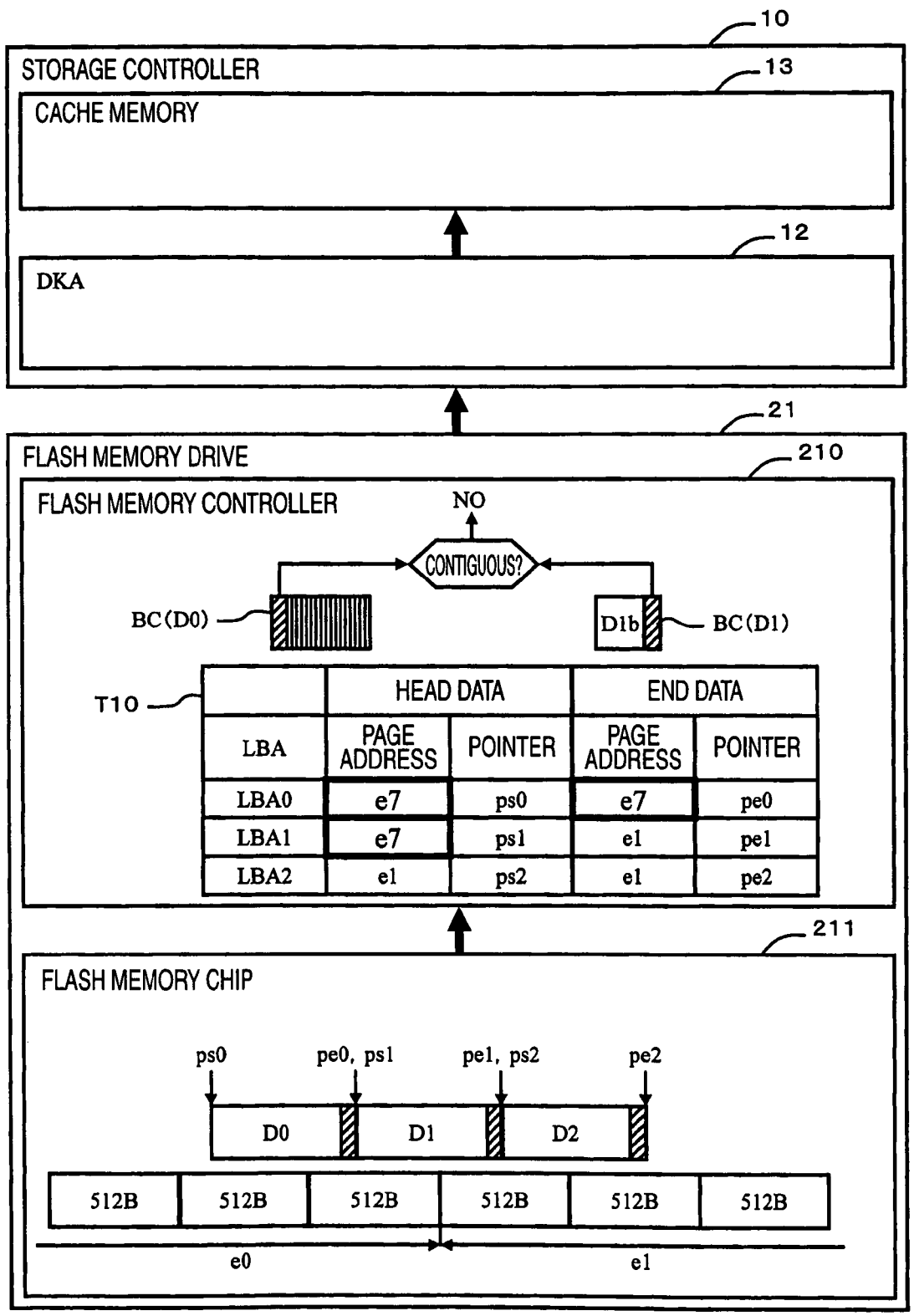
FIG. 17 is an explanatory view illustrating an outline when a reading process is not performed correctly.

FIG. 17 shows that the address management error occurs in the SSD 21. For example, in the management table T10, although data of the page e0 is moved to the page e7, in actuality, the data is not moved.

When receiving an instruction to read the data D1 from the DKA 12, the FM controller 210 reads data from the page e7 and the page e1. However, in actuality, since data is not moved, the first half D1a of the data D1 and the first protection code BC(D0) of the data D0 are not included in data read from the page e7. Therefore, the FM controller 210 determines that the logical addresses of data as a comparison are not correctly contiguous, and informs an error to the DKA 12.

Figure 18:
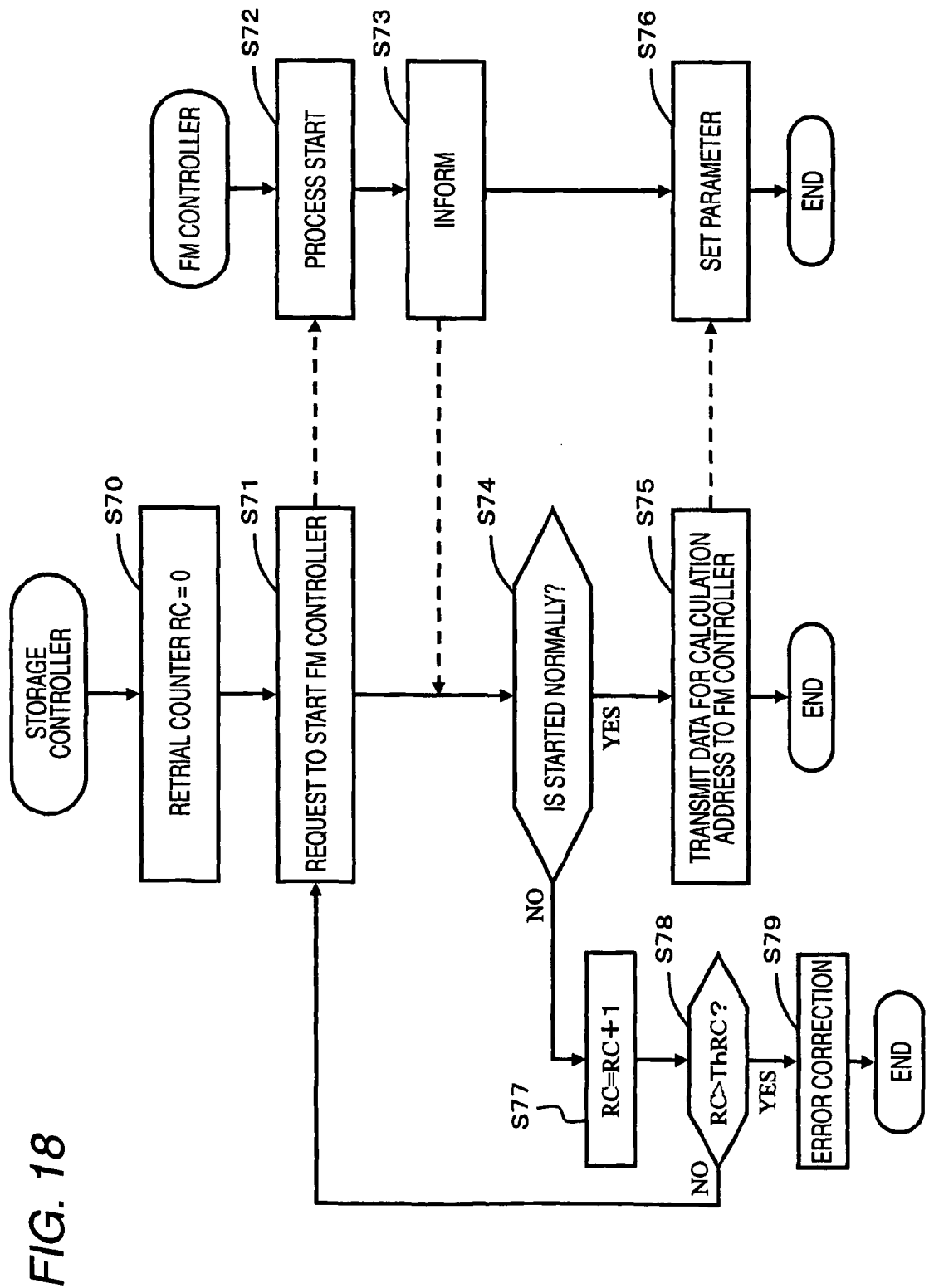
FIG. 18 is a flowchart illustrating a process for initial setting of an FM controller.

Next, a flowchart according to the embodiment and the second embodiment will be described with reference to FIGS. 18 to 20. That is, the third embodiment can be implemented with the second embodiment at the same time. FIG. 18 is a flowchart illustrating a process for initial setting.

The DKA 12 of the storage controller 10 resets the retrial counter RC (S70) and requests the FM controller 210 to start (S71). When receiving the start request, the FM controller 210 starts a start process (S72). When completing the start process, the FM controller 210 informs to the DKA 12 (S73). The DKA 12 determines whether or not the FM controller 210 is normally started (S74).

When the FM controller 210 is normally started (YES in S74), the DKA 12 transmits a parameter for address calculation to the FM controller 210 (S75). The FM controller 210 stores the parameter for address calculation received from the DKA 12 to a memory or the FM chip 211 in the FM controller (S76). The parameter for address calculation is a parameter which is used for calculating the logical address from address information (LA) included in the first protection code BC.

When the FM controller 210 is not normally started (NO in S74), the DKA 12 increases a value of the retrial counter RC by 1 (S77), and determines whether or not the value of the retrial counter RC exceeds a predetermined threshold value ThRC (S78). The DKA 12 requests the FM controller to start (S71) until the value of the counter RC exceeds the threshold value ThRC (NO in S78). When the value of the counter RC exceeds the threshold value ThRC (YES in S78), the DKA 12 performs an error correction process (S79). For example, the DKA 12 restores data, which is not read from the SSD 21, by a correction copy etc.

Figure 19:
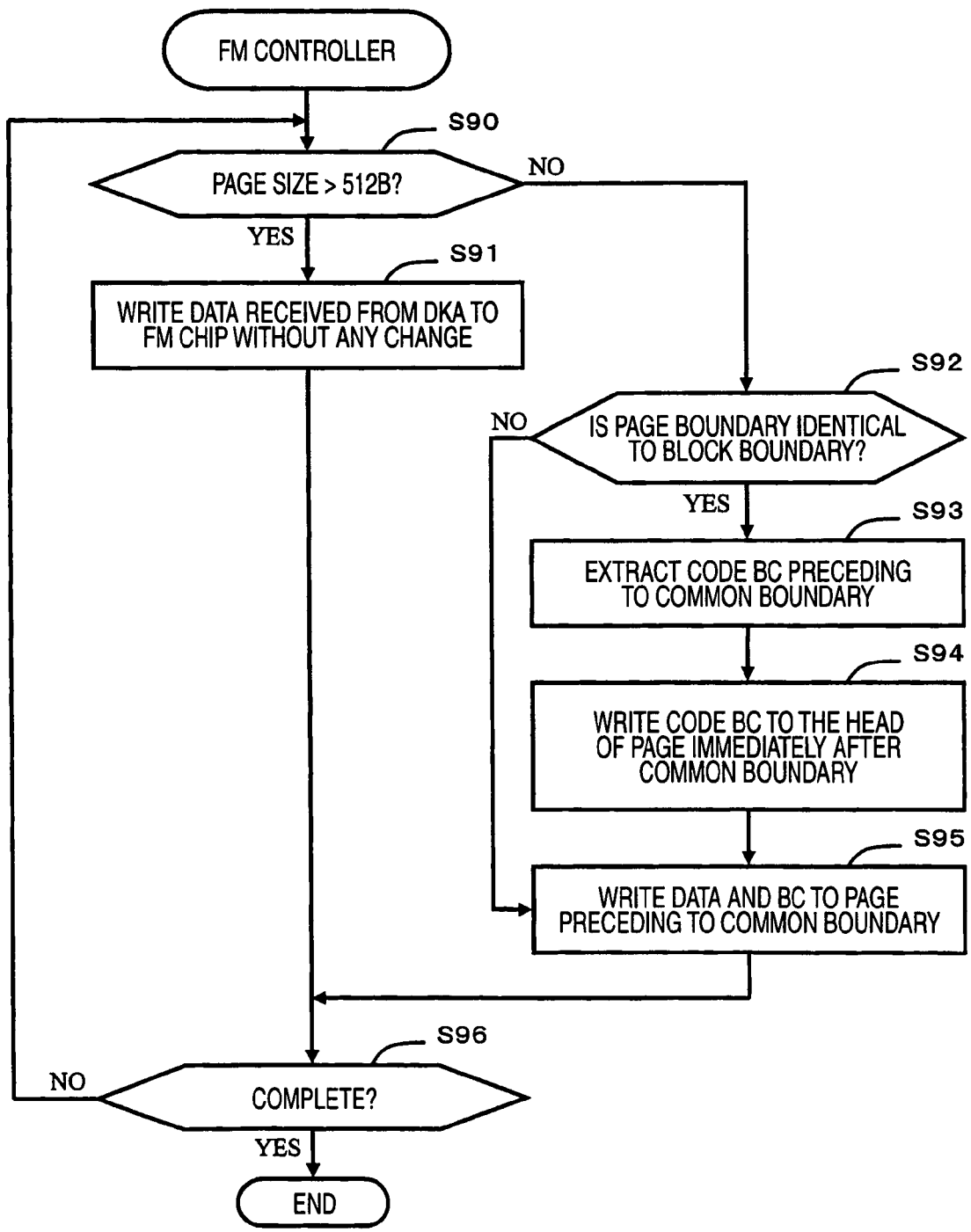
FIG. 19 is a flowchart illustrating a process for writing data to an FM chip.

FIG. 19 is a flowchart illustrating a process of a write command. When being instructed to write data from the DKA 12, the FM controller 210 determines whether or not a page size is larger than 512 bytes (S90). That is, the FM controller 210 determines that the page size is set to 512 bytes (the second embodiment), or is set to multiple times 512 bytes (the third embodiment) (S90).

When the page size is larger than 512 bytes (YES in S90), the FM controller 210 writes the data received from the DKA 12 to a page in the FM chip 211 (S91) without any change.

When the page size is smaller than 512 bytes (NO in S90), the FM controller 210 determines whether or not a page boundary is identical to a block boundary (S92). That is, the FM controller 210 determines whether or not the end of logical block is identical to the page boundary.

When the page boundary is identical to the block boundary (YES in S92), the FM controller 210 extracts the first protection code BC added to the extended logical block (S93), and adds the first protection code BC to the head of succeeding extended logical block (S94). That is, the FM controller 210 copies the first protection code BC recorded on the end of the previous page to the head of the page immediately after the common boundary BC.

Then, the FM controller 210 writes the data and the first protection code BC in a page preceding to the common boundary CB (S95). On the other hand, when the end of the target extended logical block ELK is not identical to the page boundary (NO in S92), proceeding to S95, the FM controller 210 writes the data of the target extended logical block ELK in the page (S95).

Finally, the FM controller 210 determines whether or not the writing process is completed (S96), and repeatedly performs the steps of S90 to S95 until the writing process is completed (NO in S96).

Figure 20:
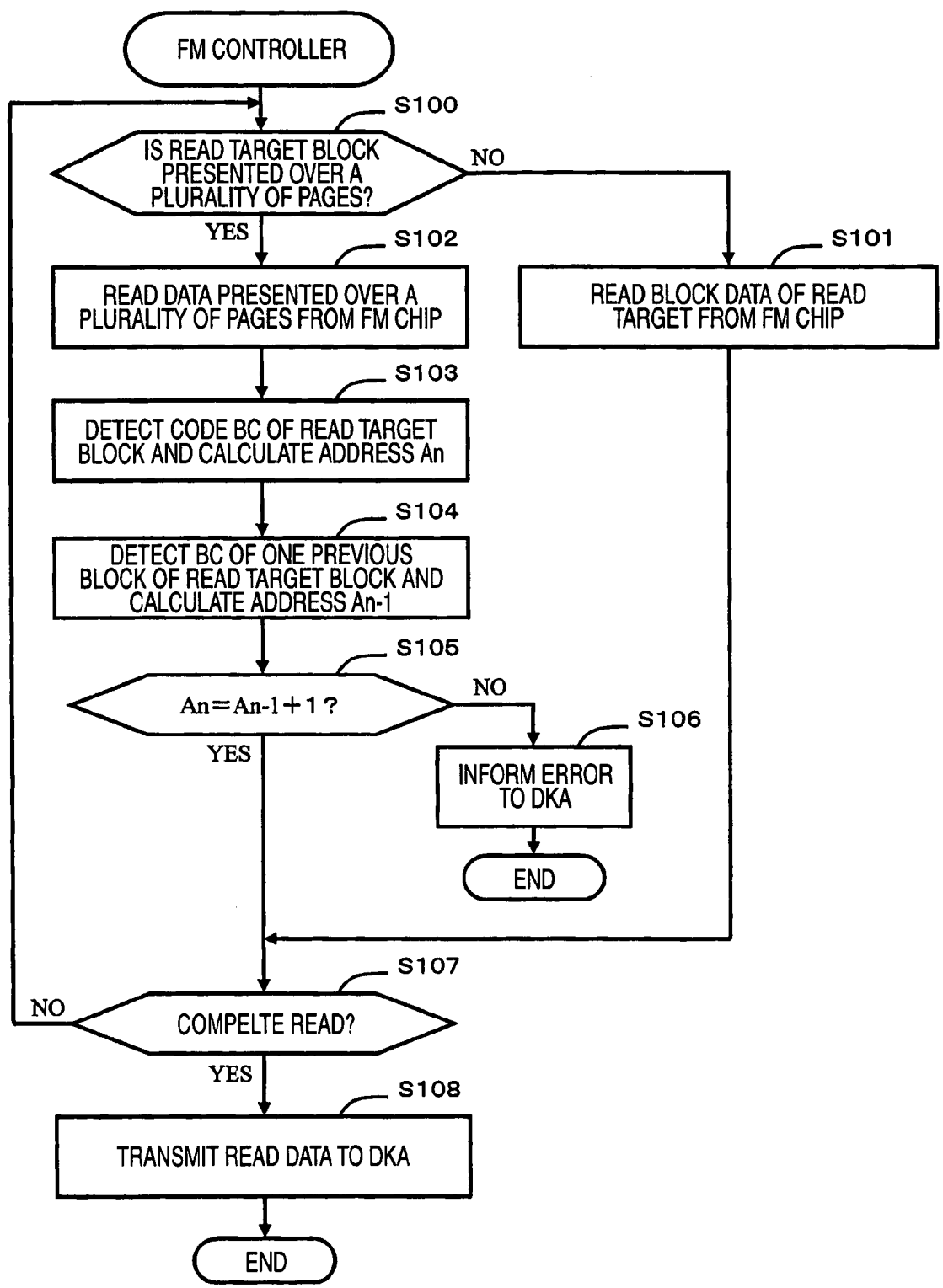
FIG. 20 is a flowchart illustrating a process for reading data from an FM chip.

FIG. 20 is a flowchart illustrating a process of a read command. When being requested to read data from the DKA 12, the FM controller 210 determines whether or not the logical block having data of a read target is presented over a plurality of pages (S100).

When the logical block of a read target is not presented over a plurality of pages (NO in S100), the FM controller 210 reads the data of the logical block of a read target from the FM chip 211 (S101).

When the logical block of a read target is presented over a plurality of pages (YES in S100), the FM controller 210 reads each page presented over the logical block of the read target (S102). The FM controller 210 extracts the first protection code BC added to the logical block of the read target and calculates the logical address An of the logical block of the read target based on the first protection code BC (S103). Further, the FM controller 210 detects the first protection code BC added to the logical block preceding to the logical block of the read target and calculates a logical address An-1 thereof.

Subsequently, the FM controller 210 determines whether or not the logical address An of the logical block of the read target is normally contiguous to the logical address An-1 of the preceding logical block (S105). When both logical addresses An and An-1 are not normally contiguous (NO in S105), the FM controller 210 informs an error to the DKA 12 (S106). The DKA 12 receives the error notice and performs, for example, a correction copy etc., and obtains desired data.

The FM controller 210 determines whether or not the data requested from the DKA 12 is completely read (S107). The steps below S100 are properly repeated until all data requested from the FM chip 211 is read (NO in S107). When all data requested from the DKA 12 is read from the FM chip 211 (YES in S107), the FM controller 210 transmits the reading data to the DKA 12 (S108) and completes the reading process.

Advantageous effect similar to the first embodiment can be obtained from the embodiment having the above-mentioned structure. Further, in the embodiment, it is determined whether or not the logical block of the read target is correctly read by comparing the first protection code BC added to the logical block of the read target and the first protection code BC added to the logical block preceding to the logical block of the read target. Therefore, in the embodiment, it is not necessary to add the second protection code FC to the logical block (the first embodiment), nor to copy the first protection code BC preceding to the common boundary CB to the page immediately after of the common boundary CB (the second embodiment). In this way, in the embodiment, it can deal with the address management error with a relatively simple configuration, and usability or reliability can be increased.

In addition, the present invention is not limited to the above-mentioned embodiments. It will be apparent to those skilled in the art from this disclosure that various additions and modifications can be made herein without departing from the scope of the invention.

What is claimed is:

1. A storage system comprising:
    a storage device for storing received data, the storage device performing a wear leveling process for averaging of a quantity of uses among pages of the storage device;
    a storage controller for controlling the storage device;
    an address data setting control unit which joins address data for specifying a logical address of the data to both a front end and a back end of the data at least when the data is stored over a plurality of pages in the storage device among data stored in the storage device; and
    a determination unit which, upon the data stored over the plurality of pages being read, determines whether or not the data stored over the plurality of pages is correct based on the address data joined to both the front end and the back end of the data.

2. The storage system according to claim 1, wherein a size of a first logical block used for managing data in the storage device is different from a size of a second logical block used for managing data in the storage controller, and
    the address data setting control unit includes a first setting unit for converting a first logical block of data into a second logical block of the data by joining first address data for specifying a logical address of the first logical block to one of a front end and a back end of the first logical block with respect to the data stored-in the first logical block.

3. The storage system according to claim 2, wherein the pages of the storage device are set to a size that is n (n>2) times the size of the first logical block,
    the address data setting control unit further includes a second setting unit which joins second address data for specifying the logical address of the first logical block to the one of the front end and the back end of the first logical block to which the first address data is not joined with respect to the data in the first logical block, and
    the determination unit, upon the data in the second logical block being read from a plurality of pages of the storage device within which the second logical block is stored, determines that the second logical block data of the data is read correctly when the first address data and the second address data specify an identical logical address, and determines that the second logical block of the data is read incorrectly when the first address data and the second address data do not specify an identical logical address.

4. The storage system according to claim 2, wherein the pages of the storage device are set to a size that is identical to the size of the first logical block,
    the address data setting control unit further includes a second setting unit which copies the first address data included within data stored in a page of the storage device that precedes a predetermined page of the storage device that does not include the first address data among the pages to a head of the predetermined page as second address data with respect to the predetermined page, and
    the determination unit, upon the data in the second logical block being read from a plurality of pages of the storage device within which the second logical block is stored, determines that the second logical block data is read correctly when the first address data and the second address data specify an identical logical address, and determines that the second logical block data is read incorrectly when the first address data and the second address data do not specify an identical logical address.

5. The storage system according to claim 4, wherein the second setting unit and the determination unit are provided in the storage device.

6. The storage system according to claim 2, wherein the pages of the storage device are set to a size that is n (n>2) times the size of the first logical block, and
the determination unit, upon the data in the second logical block being read from a plurality of pages of the storage device within which the second logical block is stored, determines whether or not the second logical block data is read correctly by comparing the first address data joined in the second logical block of the data and other first address data joined to another second logical block of data that precedes the second logical block of the data.

7. The storage system according to claim 6, wherein the determination unit determines that the second logical block of the data is read correctly when the first address data joined in the second logical block data stored over the plurality of pages has a value that is contiguous with a value of the other first address data.

8. The storage system according to claim 7, wherein the determination unit is provided in the storage device.

9. The storage system according to claim 6, wherein the determination unit is provided in the storage device.

10. The storage system according to claim 2, wherein the first setting unit joins checking data to the first logical block of the data for checking the first logical block of the data in addition to the first address data.

11. The storage system according to claim 1, wherein the storage device includes a flash memory device.

12. The storage system according to claim 1, wherein the address data setting control unit is provided in the storage controller.

13. The storage system according to claim 1, wherein the address data setting control unit is dispersedly provided at both of the storage controller and the storage device.

14. The storage system according to claim 1, wherein the storage device is provided with a controller and a memory chip controlled by the controller, and
the controller manages a correspondence relationship between the logical address of the data received from a host computer and a page address and pointer of the memory chip.

15. The storage system according to claim 1, wherein the storage device includes a flash memory device,
a size of a first logical block used for managing data in the storage device is different from a size of a second logical block used for managing data in the storage controller,
the address data setting control unit includes:
(1) a first setting unit which converts a first logical block of data into a second logical block of the data by joining first address data for specifying a logical address of the first logical block and checking data for checking the first logical block data to one of a front end and a back end of the first logical block with respect to the data in the first logical block; and
(2) a second setting unit which joins second address data for specifying the logical address of the first logical block to the one of the front end and the back end of the first logical block to which the first address data is not joined with respect to the data in the first logical block, and
the second setting unit, (2A) joins the logical address of the first logical block to the one of the front end and the back end of the first logical block to which the first address data is not joined as the second address data, (2B) copies the first address data included within data stored in a page of the storage device that precedes a predetermined page of the storage device that does not include the first address data among the pages to a head of the predetermined page as the second address data with respect to the predetermined page, or (2C) uses address data obtained by adding a predetermined value to another first address data joined to another second logical block that precedes the second logical block stored over the plurality of pages as the second address data.

16. A data guarantee method of guaranteeing data read from a storage device to be correct data, wherein a wear leveling is performed in the storage device for averaging of a quantity of uses among pages of the storage device, and a size of a first logical block used for managing data in the storage device is different from a size of a second logical block used for managing data in the storage device, the data guarantee method comprising:
converting, for each first logical block of data, the first logical block into a second logical block of the data by joining first address data for specifying a logical address of the first logical block to a back end of the first logical block when the storage device is requested for writing therein; and
determining, upon the data in the second logical block being read from a plurality of pages of the storage device within which the second logical block is stored, whether or not the second logical block data is read correctly by comparing the first address data joined in the second logical block of the data and another first address data joined to another second logical block of data that precedes the second logical block of the data.

* * * * *